United States Patent
Votaw et al.

(10) Patent No.: US 8,444,051 B2
(45) Date of Patent: May 21, 2013

(54) SELF-SERVICE MACHINE PROBLEM CODE

(75) Inventors: Elizabeth S. Votaw, Potomac, MD (US);
 Matthew A. Calman, Charlotte, NC
 (US); Hendrick Helton Ellis, Charlotte,
 NC (US)

(73) Assignee: Bank of America, Charlotte, NC (US)

( * ) Notice: Subject to any disclaimer, the term of this patent is extended or adjusted under 35 U.S.C. 154(b) by 110 days.

(21) Appl. No.: 12/819,668

(22) Filed: Jun. 21, 2010

(65) Prior Publication Data

US 2011/0309137 A1 Dec. 22, 2011

(51) Int. Cl.
 *G06F 17/00* (2006.01)
 *G06F 7/08* (2006.01)
 *G06Q 40/00* (2006.01)
 *G07D 11/00* (2006.01)

(52) U.S. Cl.
 USPC .......................... 235/379; 235/375; 235/381

(58) Field of Classification Search
 USPC .............. 235/379, 381, 383, 375; 705/39–45
 See application file for complete search history.

(56) References Cited

U.S. PATENT DOCUMENTS

| | | | | |
|---|---|---|---|---|
| 5,010,238 A | * | 4/1991 | Kadono et al. | 235/379 |
| 5,253,167 A | * | 10/1993 | Yoshida et al. | 705/43 |
| 5,303,844 A | * | 4/1994 | Muehlberger | 221/1 |
| 2008/0249658 A1 | * | 10/2008 | Walker et al. | 700/236 |

FOREIGN PATENT DOCUMENTS

WO   WO 2004036510 A1   4/2004

OTHER PUBLICATIONS

U.S. Appl. No. 12/819,620, filed Jun. 21, 2010.

* cited by examiner

*Primary Examiner* — Tuyen K Vo
(74) *Attorney, Agent, or Firm* — Michael A. Springs; Moore & Van Allen, PLLC; Padowithz Alce

(57) ABSTRACT

Embodiments of the present invention relate to methods and apparatuses for responding to a problem associated with a self-service machine. For example, some embodiments provide a method that includes: (a) determining that a problem associated with a self-service machine occurred during a transaction involving the self-service machine and a user of the self-service machine; (b) presenting, to the user via a user interface associated with the self-service machine, a code based at least partially on the determining that the problem occurred; (c) receiving the code from the user; and/or (d) initiating a claim for the user based at least partially on the receiving the code from the user, where the claim relates to the problem.

35 Claims, 9 Drawing Sheets

SELF-SERVICE MACHINE PROBLEM CODE

FIELD

In general terms, embodiments of the present invention relate to methods and apparatuses for responding to problems associated with self-service machines.

BACKGROUND

Consumers can experience a range of problems when interacting with automated teller machines (ATMs), kiosks, vending machines, self-checkout machines, and other self-service machines. For example, checks or cash may jam, cash or tickets may be misdispensed, cards may be "eaten," vending machine items may be "stuck," grocery or retail items may fail to scan, the consumer may input amounts incorrectly, and receipts or statements may fail to print. In each of these cases, the consumer is typically left with few options to address the problem. On one hand, if the consumer calls a general customer service help line, the consumer often has a long wait time and has difficulty being connected with the appropriate customer service representative. On the other hand, if the consumer travels to the nearest banking center, retail store, or other business associated with the self-service machine, the consumer's problem sometimes cannot be resolved by the staff on site. Thus, there is a need to provide methods and apparatuses for responding to problems associated with self-service machines that overcome the deficiencies in the prior art.

SUMMARY OF SELECTED EMBODIMENTS OF THE PRESENT INVENTION

In general terms, embodiments of the present invention relate to methods and apparatuses for responding to problems associated with self-service machines. For example, some embodiments of the present invention are configured to: (a) present a code to a user of a self-service machine based at least partially on determining that a problem occurred at the self-service machine; and (b) initiate a claim for the user, upon or after receiving the code from the user, where the claim relates to the problem associated with the self-service machine. In some embodiments, the code serves to identify the self-service machine, the user, the problem, and/or the transaction. Additionally or alternatively, in some embodiments, the code serves to authenticate the user to a customer service representative and/or to an apparatus in order to, for example, initiate the claim. Accordingly, it will be understood that the implementation of one or more of the embodiments of the present invention can significantly improve the customer experience; reduce retail store, banking center, and/or other business center traffic; and/or improve claim accuracy and/or efficiency.

More specifically, in some embodiments of the present invention, an apparatus is provided that includes: (a) a user interface associated with a self-service machine, where the user interface is configured to receive one or more inputs from a user of the self-service machine and communicate one or more outputs to the user; and (b) a processor operatively connected to the user interface and configured to: (i) determine that a problem associated with the self-service machine occurred during a transaction involving the self-service machine and the user; and (ii) present, via the user interface, a code to the user based at least partially on the processor determining that the problem occurred.

In some embodiments of the apparatus, the user interface includes a receipt printer configured to print one or more receipts, and in some embodiments, the processor is configured to present the code to the user by instructing the receipt printer to print a receipt that includes the code. Additionally or alternatively, in some embodiments, the user interface includes a display configured to display information, and in some embodiments, the processor is configured to present the code to the user by instructing the display to display the code to the user.

It will also be understood that, in some embodiments of the present invention, the processor is configured to: (a) receive the code from the user; and (b) initiate a claim for the user based at least partially on the receiving the code from the user, where the claim relates to the problem. Additionally or alternatively, in some embodiments, the processor is configured to: (a) store the code presented to the user in memory; (b) receive the code from the user; and (c) authenticate the user as being the user involved in the transaction based at least partially on a comparison of the code received from the user to the code stored in memory. In some embodiments, the processor is further configured to initiate a claim for the user based at least partially on the processor authenticating the user, where the claim relates to the problem.

As another example, in some embodiments of the present invention, a method is provided that includes: (a) determining, using a processor, that a problem associated with a self-service machine occurred during a transaction involving the self-service machine and a user of the self-service machine; and (b) presenting, to the user via a user interface associated with the self-service machine, a code based at least partially on the determining that the problem occurred.

In some embodiments of the method, the user interface includes a receipt printer configured to print one or more receipts, and in some embodiments, the presenting the code to the user includes printing, at the receipt printer, a receipt including the code. Additionally or alternatively, in some embodiments of the method, the user interface includes a display configured to display information, and in some embodiments, the presenting the code to the user includes displaying, at the display, the code to the user.

In some embodiments of the present invention, the method includes: (a) receiving the code from the user; and (b) initiating a claim for the user based at least partially on the receiving the code from the user, where the claim relates to the problem. Additionally or alternatively, in some embodiments, the method includes: (a) storing the code presented to the user in memory; (b) receiving the code from the user; and (c) authenticating the user as being the user involved in the transaction based at least partially on a comparison of the code received from the user to the code stored in memory. In some embodiments, the method further includes initiating a claim for the user based at least partially on the authenticating the user, where the claim relates to the problem.

In some embodiments, the code serves to identify at least one of the self-service machine, the problem, the transaction, or the user. For example, in some embodiments, the code includes information that identifies at least one of the self-service machine, the problem, the transaction, or the user. As another example, in some embodiments, the code is stored in memory, such that the code is associated with information, where the information is associated with at least one of the self-service machine, the problem, the transaction, or the user. Of course, it will be understood that, in some embodiments of the present invention, the self-service machine includes an ATM.

As another example, in some embodiments of the present invention, an apparatus is provided that includes: (a) a user interface associated with a self-service machine, where the user interface is configured to receive one or more inputs from a user of the self-service machine and communicate one or more outputs to the user; and (b) a processor operatively connected to the user interface and configured to: (i) present, via the user interface, a code to the user during a transaction involving the user and the self-service machine; (ii) receive the code from the user; and (iii) authenticate the user as being the user involved in the transaction based at least partially on the processor receiving the code from the user.

In some embodiments of the apparatus, the processor is configured to present the code to the user based at least partially on a determination that a problem associated with the self-service machine occurred during the transaction. Additionally or alternatively, in some embodiments, the processor is configured to store the code presented to the user in memory, and in some embodiments, the processor is configured to authenticate the user based at least partially on a comparison of the code received from the user to the code stored in memory. Also, in some embodiments of the apparatus, the processor is configured to initiate a claim for the user based at least partially on the processor authenticating the user, where the claim relates to a problem associated with the self-service machine that occurred during the transaction.

As still another example, in some embodiments, a method is provided that includes: (a) presenting, via a user interface associated with a self-service machine, a code to a user of the self-service machine during a transaction involving the user and the self-service machine; (b) receiving the code from the user; and (c) authenticating the user as being the user involved in the transaction based at least partially on the receiving the code from the user.

In some embodiments of the method, the presenting the code to the user is based at least partially on a determination that a problem associated with the self-service machine occurred during the transaction. Additionally or alternatively, in some embodiments, the method further includes storing the code presented to the user in memory, and the authenticating the user includes authenticating the user as being the user involved in the transaction based at least partially on a comparison of the code received from the user to the code stored in memory. Also, in some embodiments, the method includes initiating a claim for the user based at least partially on the authenticating the user, where the claim relates to a problem associated with the self-service machine that occurred during the transaction.

As yet another example, in some embodiments, a computer program product including a non-transitory computer-readable medium is provided, where the computer-readable medium includes computer-executable program code portions stored therein, and where the computer-executable program code portions include: (a) a first program code portion configured to determine that a problem associated with a self-service machine occurred during a transaction involving the self-service machine and a user of the self-service machine; and (b) a second program code portion configured to present, to the user via a user interface associated with the self-service machine, a code based at least partially on the determining that the problem occurred.

In some embodiments, the computer program product further includes: (a) a program code portion configured to receive the code from the user; and (b) a program code portion configured to initiate a claim for the user based at least partially on receiving the code from the user, where the claim relates to the problem. Additionally or alternatively, in some embodiments, the computer program product includes: (a) a program code portion configured to store the code presented to the user in memory; (b) a program code portion configured to receive the code from the user; and (c) a program code portion configured to authenticate the user as being the user involved in the transaction based at least partially on a comparison of the code received from the user to the code stored in memory. In some embodiments, the computer program product further includes a program code portion configured to initiate a claim for the user based at least partially on the program code portion authenticating the user, where the claim relates to the problem.

BRIEF DESCRIPTION OF THE DRAWINGS

Figure 1:
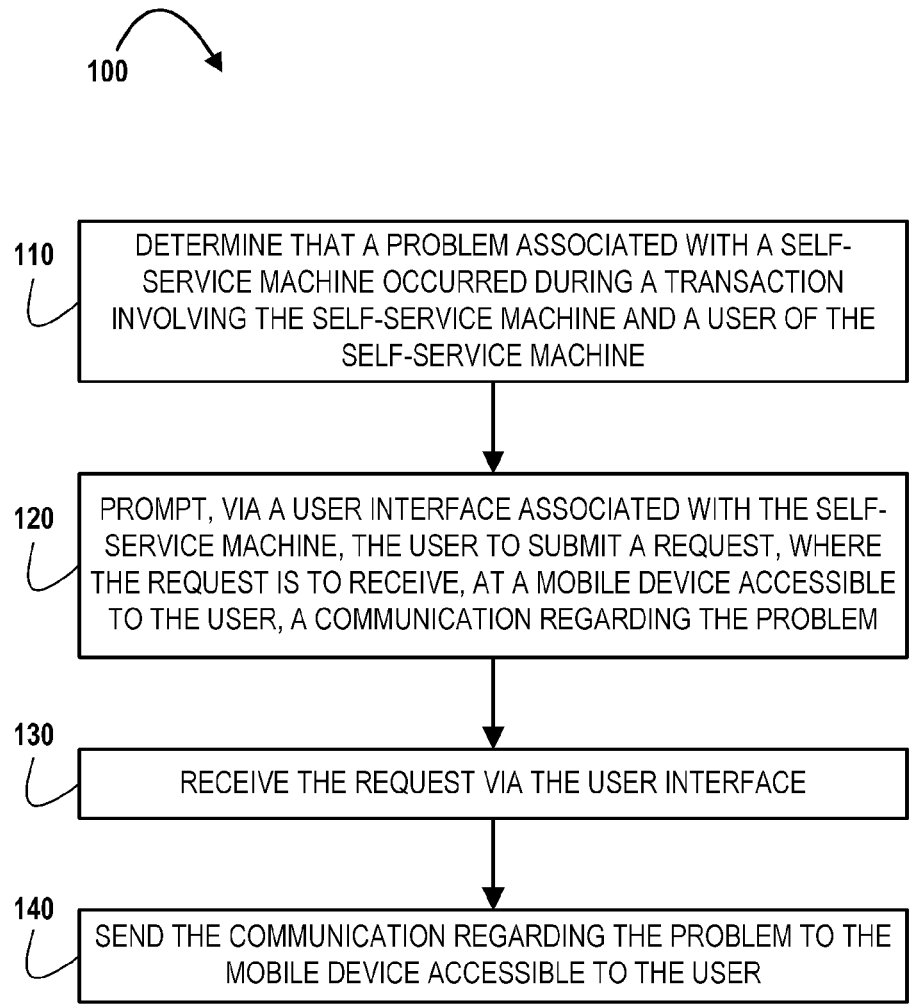
Figure 2:
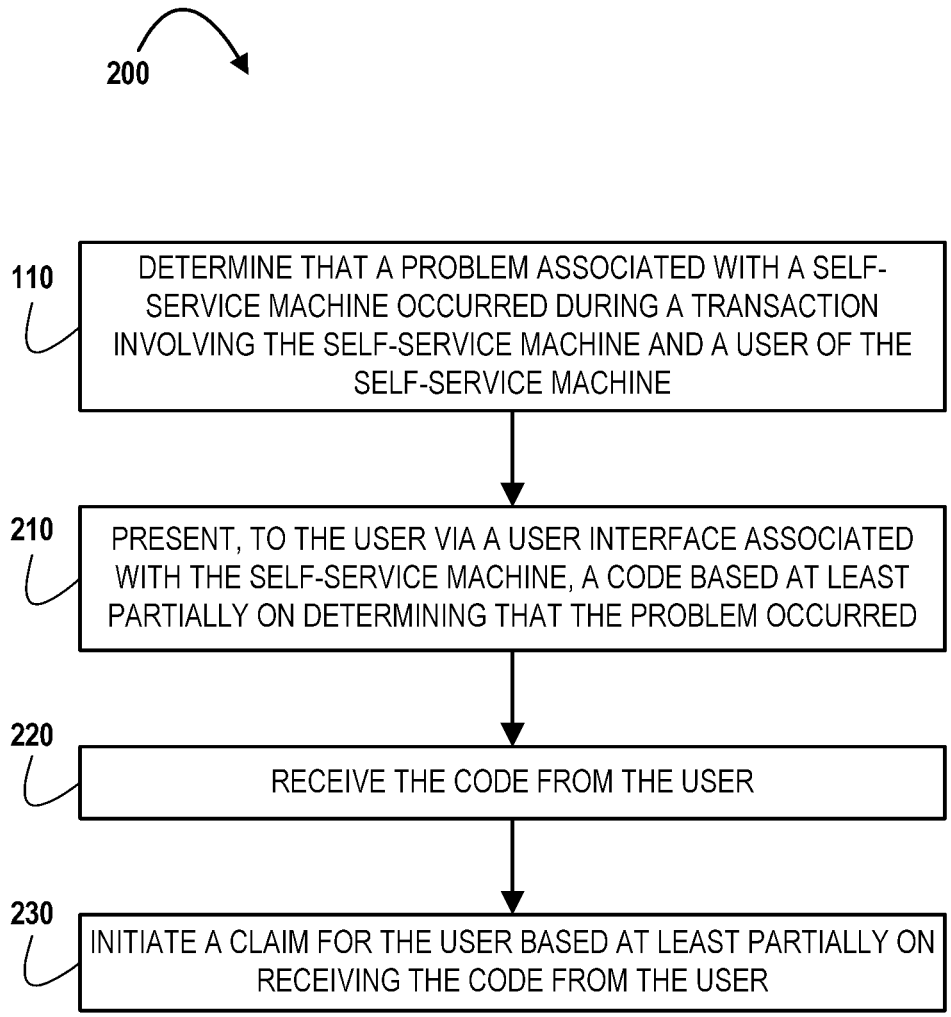
Figure 3:
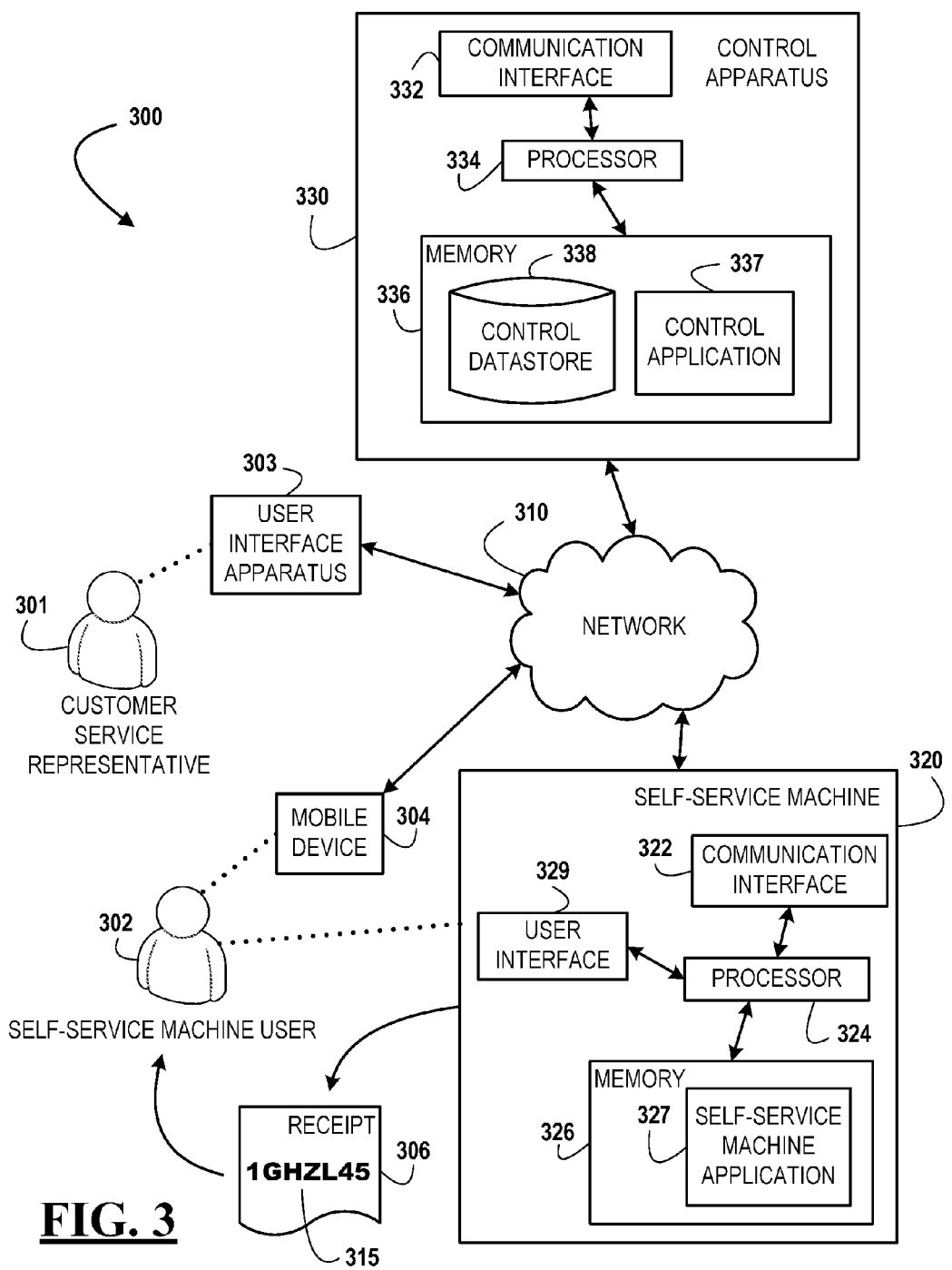
Figure 4:
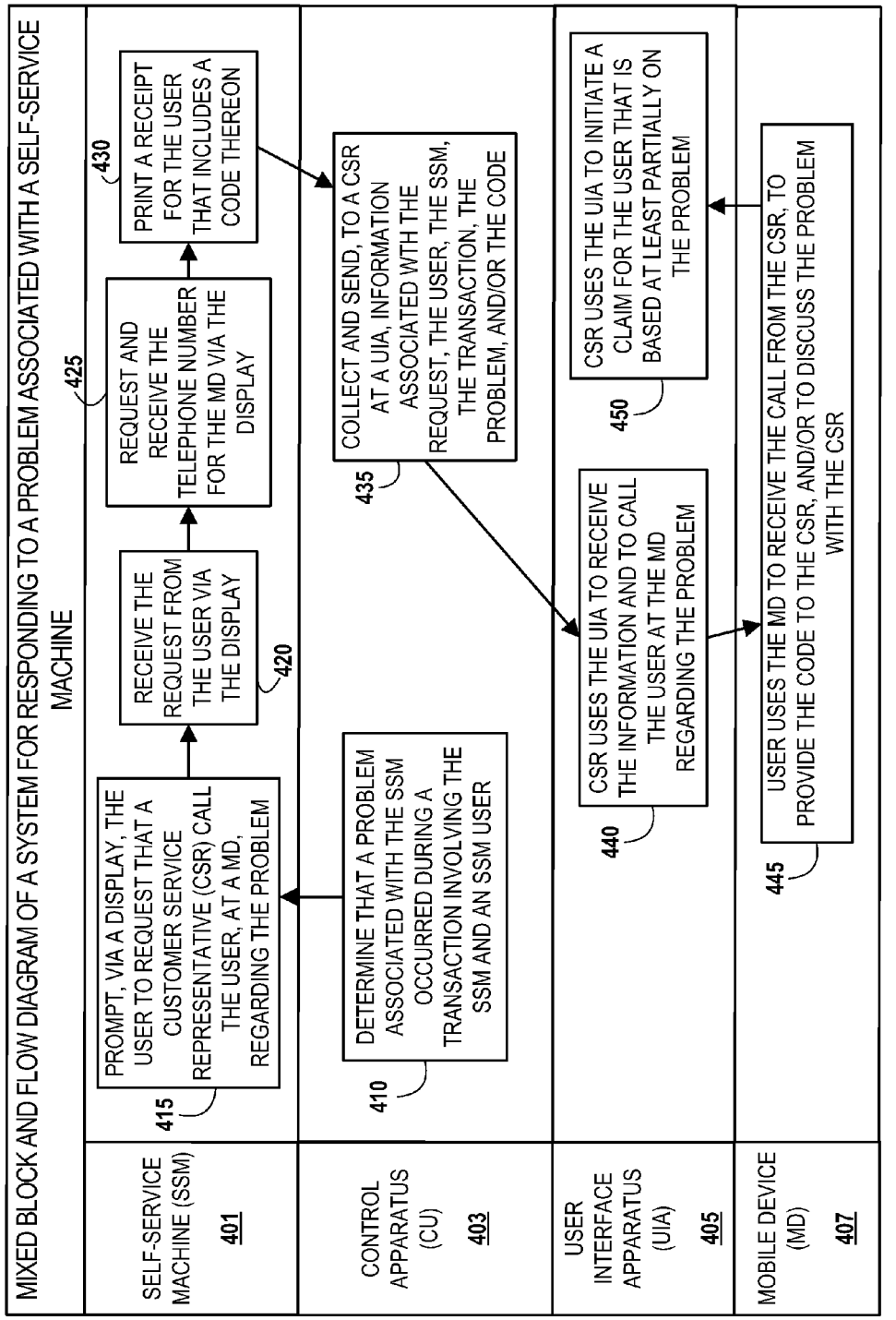
Figure 5:
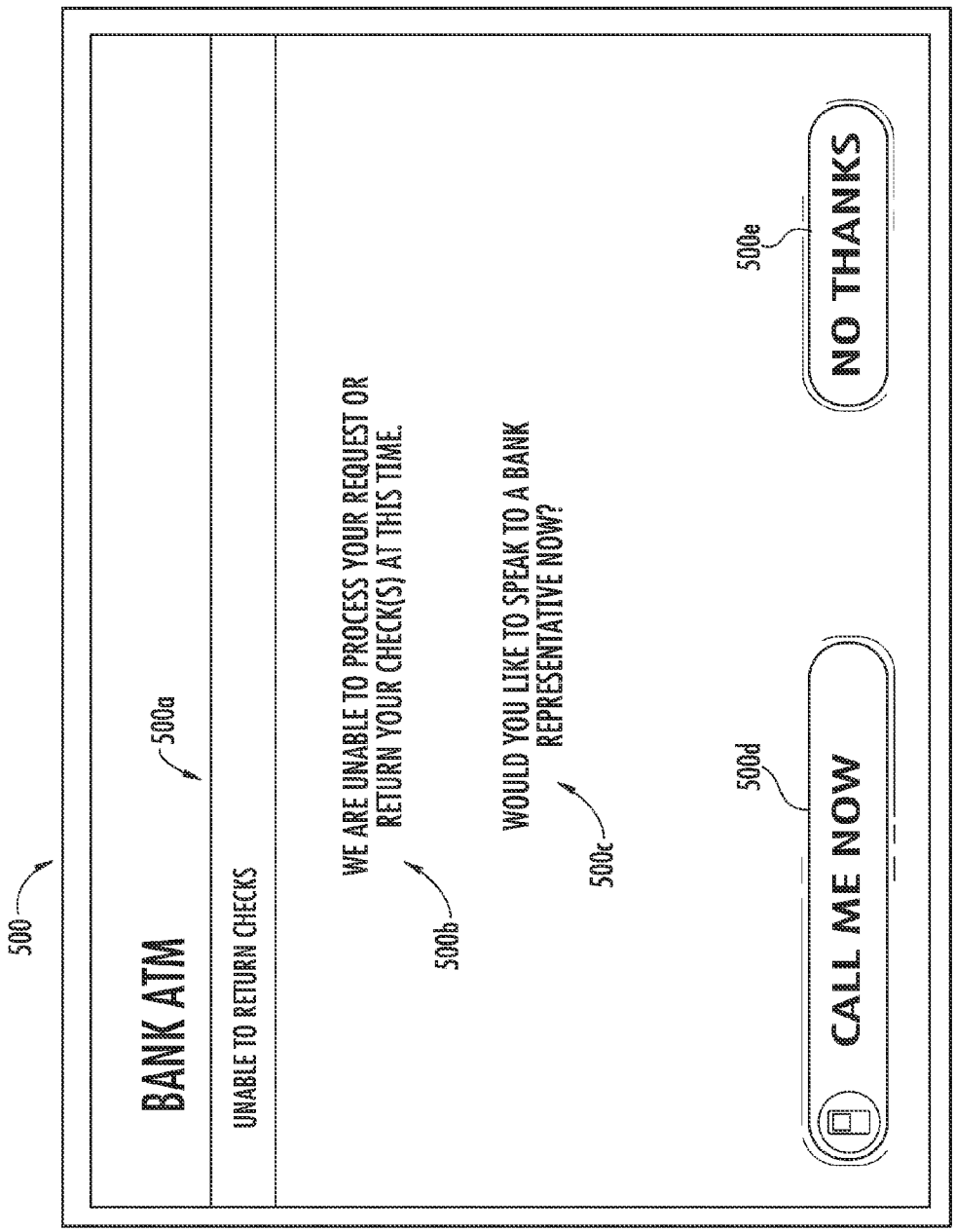
Figure 5A:
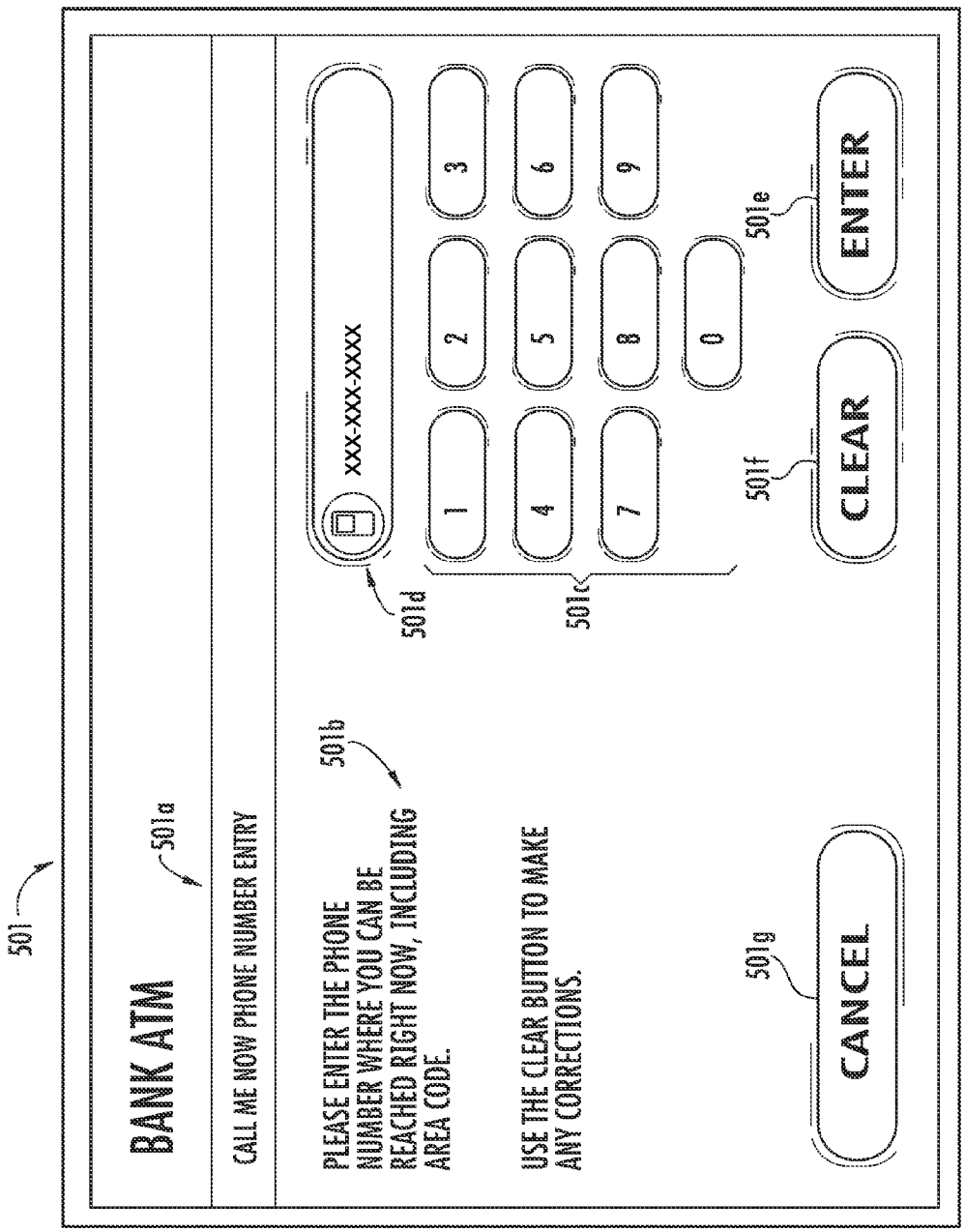
Figure 5B:
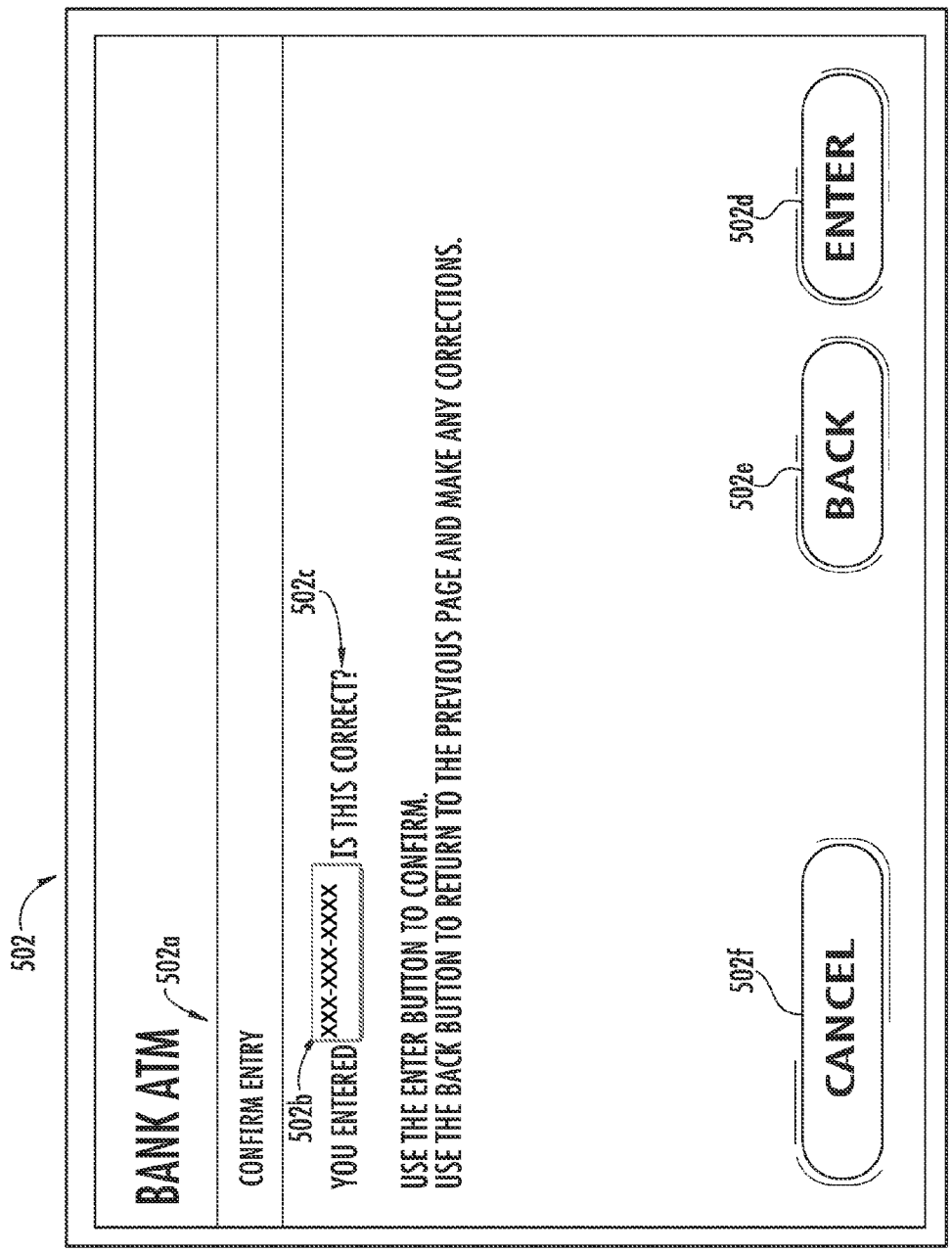
Figure 5C:
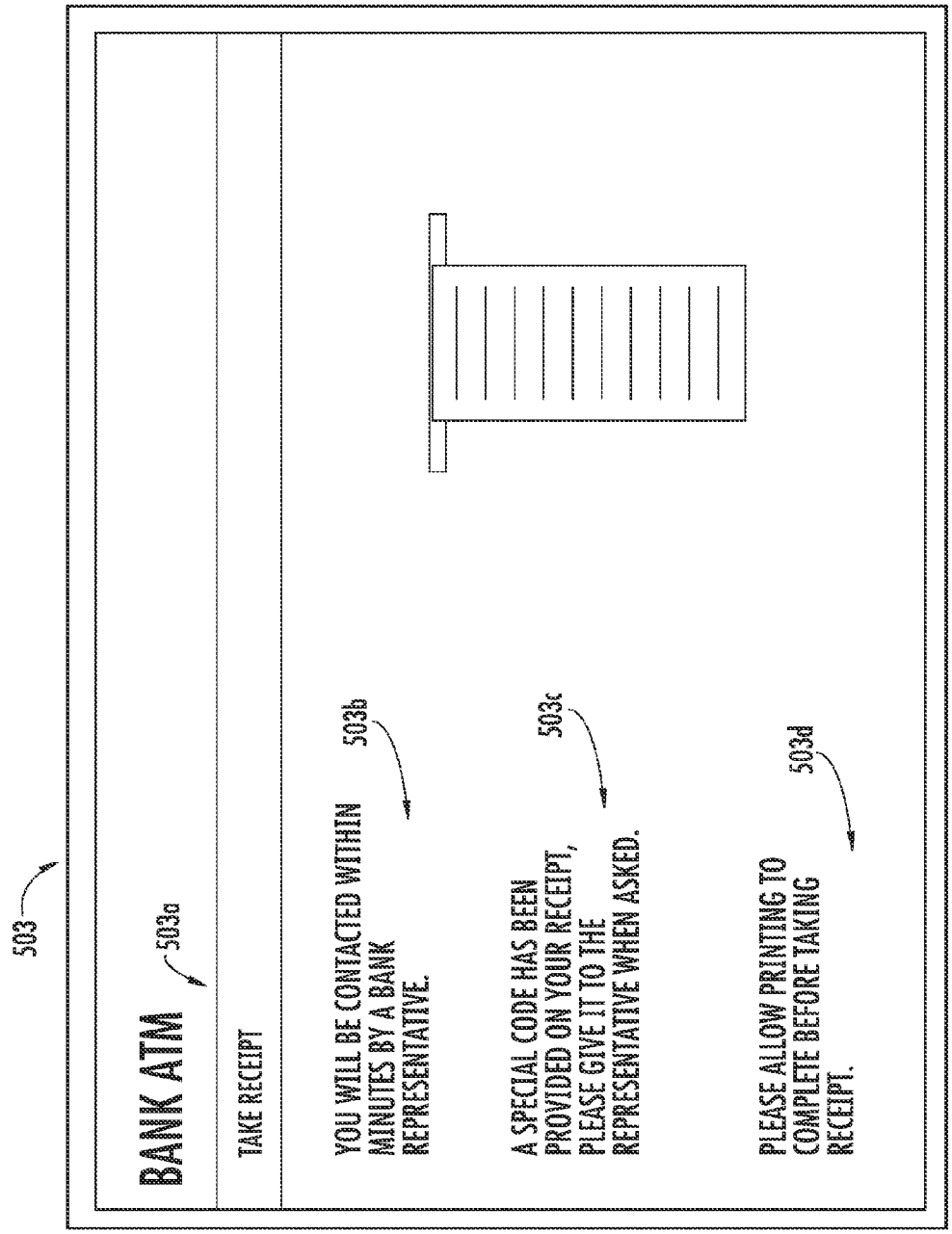
Figure 5D:
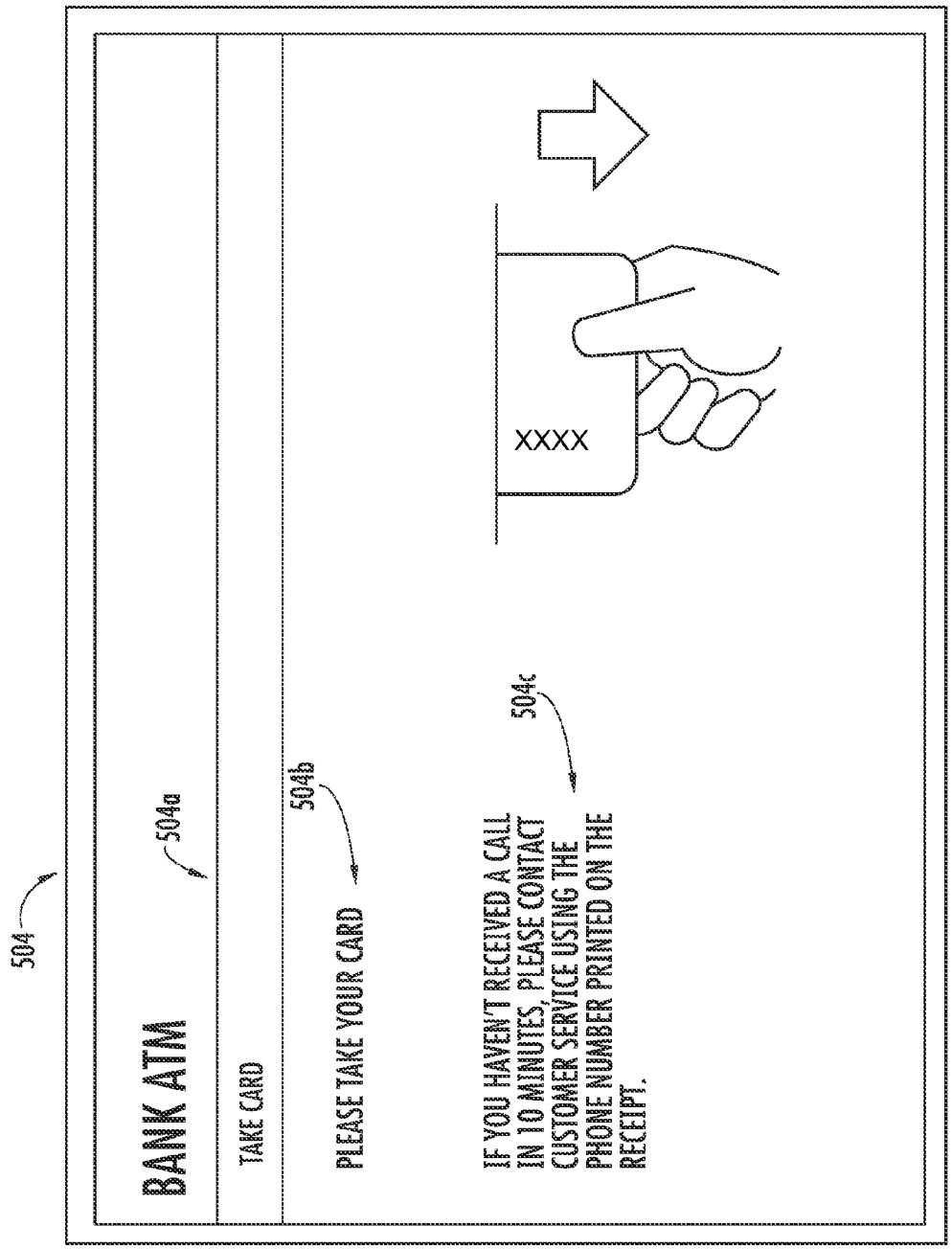

Having thus described some embodiments of the present invention in general terms, reference will now be made to the accompanying drawings, wherein:

FIG. 1 is a flow diagram illustrating a general process flow of an apparatus for responding to a problem associated with a self-service machine by sending a communication regarding the problem to a mobile device accessible to the self-service machine user, in accordance with an embodiment of the present invention;

FIG. 2 is a flow diagram illustrating a general process flow of an apparatus for responding to a problem associated with a self-service machine by presenting a code that relates to the problem to the self-service machine user, in accordance with an embodiment of the present invention;

FIG. 3 is a block diagram illustrating technical components of a system for responding to a problem associated with a self-service machine, in accordance with an embodiment of the present invention;

FIG. 4 is a mixed block and flow diagram of a system for responding to a problem associated with a self-service machine, in accordance with an embodiment of the present invention;

FIG. 5 illustrates an exemplary display page of a touchscreen display that is associated with an automated teller machine (ATM), in accordance with an embodiment of the present invention;

FIG. 5A illustrates another exemplary display page of a touchscreen display that is associated with an ATM, in accordance with an embodiment of the present invention;

FIG. 5B illustrates another exemplary display page of a touchscreen display that is associated with an ATM, in accordance with an embodiment of the present invention;

FIG. 5C illustrates another exemplary display page of a touchscreen display that is associated with an ATM, in accordance with an embodiment of the present invention; and FIG. 5D illustrates another exemplary display page of a touchscreen display that is associated with an ATM, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, and/or operational aspects of any of the embodiments described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses and/or methods. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory and/or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

In general terms, embodiments of the present invention relate to methods and apparatuses for responding to problems associated with self-service machines. For example, some embodiments of the present invention are configured to: (a) determine that a problem associated with a self-service machine occurred during a transaction involving the self-service machine and a user of the self-service machine; and (b) send a communication (e.g., place a telephone call, etc.) regarding the problem to a mobile device (e.g., a mobile phone, etc.) accessible to the user, such that the communication is sent to the mobile device within moments, seconds, and/or minutes of the problem occurring. As another example, some embodiments of the present invention are additionally or alternatively configured to: (a) present a code to the user based at least partially on determining that the problem occurred; and (b) initiate a claim for the user, upon receiving the code from the user, where the claim relates to the problem associated with the self-service machine. In some embodiments, the code includes information associated with (e.g., information about, information describing, information identifying, etc.) the self-service machine (e.g., location, type, etc.), the user (e.g., name, customer number, etc.), the problem (e.g., date and time the problem occurred, etc.), and/or the transaction (e.g., error code, type and/or nature of the problem, etc.). Additionally or alternatively, in some embodiments, the code serves to authenticate the user to a customer service representative and/or to an apparatus in order to, for example, initiate the claim. Accordingly, it will be understood that the implementation of one or more of the embodiments of the present invention can significantly improve the customer experience; reduce retail store, banking center, and/or other business center traffic; and/or improve claim accuracy and/or efficiency.

Referring now to FIG. 1, a general process flow 100 of an apparatus for responding to a problem associated with a self-service machine is provided, in accordance with an embodiment of the present invention. As represented by the block 110, the apparatus is configured to determine that a problem associated with a self-service machine occurred during a transaction involving the self-service machine and a user of the self-service machine. As represented by the block 120, the apparatus is also configured to prompt, via a user interface associated with the self-service machine, the user to submit a request, where the request is to receive, at a mobile device accessible to the user, a communication regarding the problem. In addition, as represented by the block 130, the apparatus is configured to receive the request via the user interface. Further, as represented by the block 140, the apparatus is configured to send the communication regarding the problem to the mobile device accessible to the user.

For simplicity, it will be understood that the portion of the process flow represented by the block 110 is sometimes referred to herein as the "problem determination." In addition, it will be understood that, the term "determine," as used herein, is meant to have its ordinary meaning (i.e., its ordinary dictionary definition) in addition to the one or more ordinary meanings of the following terms: discover, learn, calculate, observe, read, decide, conclude, verify, ascertain, and/or the like.

It will also be understood that the apparatus having the process flow 100 can include one or more separate apparatuses (e.g., the self-service machine 320, the control apparatus 330, and/or the user interface apparatus 303 described in FIG. 3, etc.). For example, in some embodiments, one apparatus (e.g., the control apparatus 330, etc.) is configured to perform the portions of the process flow 100 represented by the blocks 110-130, and a second apparatus (e.g., the user interface apparatus 303, etc.) is configured to perform the portion represented by the block 140. As another example, in some embodiments, one apparatus (e.g., the control apparatus 330, etc.) is configured to perform the portion of the process flow 100 represented by the block 110, and a second apparatus (e.g., the self-service machine 320, etc.) is configured to perform the portions represented by the blocks 120-140. As still another example, in some embodiments, a single apparatus (e.g., the control apparatus 330, etc.) is configured to perform each and every portion of the process flow 100. It will also be understood that, in some embodiments, a self-service machine (e.g., the self-service machine 320, etc.) is configured to perform one or more (or all) of the portions of the process flow 100, and that in some embodiments, that self-service machine is the self-service machine referred to in the blocks 110 and 120.

Regarding the block 110, the phrase "self-service machine," as used herein, typically refers to an interactive computer terminal that is configured to initiate, perform, and/or facilitate one or more transactions. It will also be understood that, in some embodiments, the self-service machine is located in a public place and available for public use (e.g., on a street corner, on the exterior wall of a banking center, at a public rest stop, etc.). In other embodiments, the self-service machine is additionally or alternatively located in a place of business and available for public and/or business customer use (e.g., in a post office, in a banking center, in a grocery store, etc.). It will also be understood that the self-service machine is generally not owned by the user involved in the transaction with the self-service machine. Accordingly, examples of self-service machines include, but are not limited to, an automated teller machine (ATM), a public and/or business kiosk (e.g., an Internet kiosk, ticketing kiosk, telekiosk, donation kiosk, DVD vending kiosk, airline/train check-in kiosk, bill pay kiosk, etc.), a vending machine, a self-checkout machine (e.g., at a grocery store, retail store, etc.), and/or the like. It will be understood that the self-service machine does not include a personal computer that is located in a user's home and owned by the user.

It will also be understood that the transaction involving the self-service machine and the user can include any number and/or type of transaction(s) involving a self-service machine. For example, in some embodiments, the transaction includes one or more of the following: withdrawing cash; viewing account balances; making deposits (e.g., cash, checks, etc.); making payments (e.g., paying monthly bills; paying federal, state, and/or local taxes and/or bills; sending and/or receiving remittances, etc.); transferring balances; printing statements; managing accounts; loading money onto stored value cards; purchasing, renting, selling, and/or leasing goods and/or services (e.g., stamps, tickets (e.g., movie tickets, plane/train/bus tickets, concert tickets, sporting event tickets, etc.), gift certificates, DVDs, vending machine items, merchandise, groceries, etc.); donating to charities; initiating, completing, and/or sending an application (e.g., applying for a job, applying for a loan, etc.); receiving and/or sending communications (e.g., telephone call, fax, email, text, etc.); accessing the Internet; and/or the like.

Also, it will be understood that the problem associated with the self-service machine adversely affects one or more of the functions of the self-service machine. As examples, the problem can include: deposited cash and/or checks not being recognized; cash and/or tickets being misdispensed; cash and/or checks jamming; vending machine items being "stuck;" grocery and/or retail store items not scanning properly; debit, credit, and/or ATM cards being "eaten;" receipts and/or statements not printing properly; the self-service machine becoming dirty and/or otherwise in need of servicing; and/or the like. It will be understood that the problem can involve any combination of hardware, software, and/or user error. In addition, the problem can arise from the self-service machine, from a user of the self-service machine, and/or from one or more apparatuses (and/or users thereof) located away from, but operatively connected to, the self-service machine. For example, in some embodiments, the problem is caused by malfunctioning hardware and/or software housed in the self-service machine. As another example, in some embodiments, the problem is caused by user error, such as, for example, when a user of an ATM inputs an incorrect deposit amount and is unable to remedy the error. As still another example, in some embodiments, the problem is caused by malfunctioning hardware and/or software housed in a back end server that is operatively connected to the self-service machine. It will be understood that, in some embodiments, the self-service machine is able to at least partially function after the problem occurs, but that in other embodiments, only the user interface associated with the self-service machine can function after the problem occurs.

Further regarding the block 110, it will be understood that the apparatus having the process flow 100 is configured to make the problem determination at some point after the user approaches the self-service machine for the transaction and before the user leaves the self-service machine. In some embodiments, this means that the apparatus is configured to make the problem determination "during the transaction" (or attempted transaction) involving the self-service machine and the user. Additionally or alternatively, in some embodiments, the apparatus having the process flow 100 is configured to make the problem determination in real time or near real time (collectively defined herein as "substantially real time" for simplicity), such that the apparatus is configured to determine that the problem occurred immediately or nearly immediately after the problem actually occurred.

It will also be understood that the apparatus having the process flow 100 can be configured to make the problem determination in any way. For example, in some embodiments, the apparatus is configured to determine that the problem occurred based at least partially on receiving a message, alert, and/or error code from the self-service machine and/or from one or more apparatuses operatively connected to the self-service machine. In some embodiments, the apparatus having the process flow 100 is configured to determine that the problem occurred based at least partially on receiving a communication from the user of the self-service machine, where the communication is received by the apparatus having the process flow 100 via the self-service machine and/or via some other apparatus (e.g., a mobile device accessible to the user, etc.). For example, in some embodiments, the user notifies the apparatus having the process flow 100 of the problem by using the mobile device accessible to the user. As another example, in some embodiments, the apparatus having the process flow 100 is configured to continuously or periodically prompt the self-service machine user to notify the apparatus (and/or a user thereof) regarding a problem associated with the self-service machine, such that the apparatus is configured to determine that a problem occurred if the apparatus receives such a notification. In some embodiments, this notification includes the request to receive the communication at the mobile device accessible to the user.

Regarding the block 120, it will be understood that the user interface can include any type and/or number of user interfaces, such as, for example, the user interface 329 described in more detail herein. It will also be understood that the user interface is accessible to the user of the self-service machine at the self-service machine location. This means that, in some embodiments, the user interface is housed in the self-service machine and is operatively connected to the self-service machine. However, in other embodiments, the user interface is not housed in the self-service machine, but is instead located adjacent, near, and/or otherwise proximate to the self-service machine (e.g., a touchscreen display located within arm's reach of the self-service machine, etc.). Also, it will be understood that, in some embodiments, the user interface is not operatively connected to the self-service machine but is instead only operatively connected to the apparatus having the process flow 100.

It will also be understood that the apparatus having the process flow 100 can be configured to prompt the user, via the user interface, to submit the request in any way. For example, in some embodiments where the user interface includes a display, the apparatus is configured to instruct the display to present an input feature (e.g., selectable button, link, etc.) on the display that invites the user to use the input feature to submit the request for the communication. As another example, in some embodiments where the user interface includes a speaker, the apparatus having the process flow 100 is configured to instruct the speaker to output one or more audible instructions that instruct the user to, for example, depress a physical button and/or speak into a microphone located on and/or near the self-service machine in order to submit the request for the communication.

Regarding the blocks 120 and 140, it will be understood that the communication regarding the problem can be any communication capable of being received by a mobile device. The term "mobile device," as used herein, refers to a wireless and portable (and often handheld) computing device that is configured to send and/or receive communications. Examples of mobile devices include, but are not limited to, mobile phones (e.g., feature phones, smart phones, etc.), personal digital assistants (PDAs), handheld computers (e.g., laptop computers, tablet computers, etc.), handheld game consoles (e.g., Nintendo DS®), PlayStation Portable®, etc.), and/or the like. Accordingly, the "communication" referred to in the blocks 120 and 140 may include one or more telephone calls, text messages, instant messages, voice messages, voice recordings, interactive voice response (IVR) communications, pages, emails, communications specific to one or more social media networks (e.g., Facebook®, Twitter®, MySpace®, etc.), and/or the like.

It will also be understood that the mobile device referred to in the blocks 120 and 140 is accessible to the user. For example, in some embodiments, the mobile device is owned, possessed, controlled, and/or carried by the user at the time of the transaction involving the self-service machine and the user, and/or at the time the communication regarding the problem is received by the mobile device. However, in other embodiments, the mobile device is owned, possessed, controlled, and/or carried by someone other than the user at the time of the transaction and/or at the time the communication is received. For example, if the user is not carrying a mobile device at the time of the transaction, the user may request that the communication be sent to a mobile device carried by a friend who is accompanying the user at the time of the transaction.

Also regarding the blocks 120 and 140, it will be understood that the communication sent to the mobile device serves to acknowledge, address, resolve, and/or otherwise respond to the problem associated with the self-service machine. In some embodiments, a customer service representative (e.g., an employee of a business working in that business's customer service department and/or claims department, an employee of call center, etc.) initiates and/or participates in the communication sent to the mobile device. For example, in some embodiments, a customer service representative may use one or more portions of the apparatus having the process flow 100 (e.g., the user interface apparatus 303 in FIG. 3, etc.) to call the user at the mobile device. In such embodiments, the customer service representative and the user can use the call to discuss, for example, the details of the problem (e.g., what happened, how did it happen, where did it happen, etc.), how to resolve the problem, and/or the like. As another example, instead of conducting a telephone call, the customer service representative and the user may discuss the problem via text messages and/or an instant messenger service (e.g., Google® Chat, AOL Instant Messenger®, etc.).

In other embodiments, the apparatus having the process flow 100 is additionally or alternatively configured to send the communication to the mobile device automatically (i.e., without human intervention). For example, in some embodiments, the apparatus having the process flow 100 is configured to automatically send a text message to the mobile device accessible to the user, where the text message includes a phone number for the user to call to speak to a customer service representative regarding the problem. As another example, in some embodiments, the apparatus having the process flow 100 is configured to automatically send a voice recording to the mobile device accessible to the user, where the voice recording informs the user that a claim is being processed for the user (which is described in more detail below). As still another example, in some embodiments, the apparatus having the process flow 100 is configured to automatically send an email to an email address associated with the user, such that the email can be received at the mobile device accessible to the user, and such that the email acknowledges the problem associated with the self-service machine and/or informs the user that steps are being taken or will be taken in order to resolve the problem. As yet another example, in some embodiments, the apparatus having the process flow 100 is configured to send and/or receive one or more IVR communications to and/or from the mobile device accessible to the user, such that the user can communicate, via one or more voice commands and/or mobile device keypad inputs, with the apparatus regarding the problem and/or regarding a claim related to the problem. In such embodiments, it will be understood that the apparatus having the process flow 100 can be configured to respond to the user's one or more inputs with pre-recorded and/or dynamically generated audio (e.g., which may include one or more menu options, etc.) in order to further communicate with the user and/or direct the user how to proceed.

It will be understood that, in some embodiments, the communication may be used to initiate a claim for the user. For example, in some embodiments where the self-service machine is embodied as an ATM, and where the problem includes the ATM erroneously dispensing $100 fewer than requested (and/or debited from the user's account), a customer service representative may use one or more portions of the apparatus having the process flow 100 to call the user to receive information from the user (e.g., information associated with the user, the ATM, the problem, etc.) and then initiate a claim on behalf of the user for the $100. As another example, in some embodiments, the apparatus having the process flow 100 is configured to automatically send an email to an email address associated with the user, such that the email can be received at the mobile device accessible to the user, and such that the email includes a link to a website where the user may initiate a claim.

Further regarding the blocks 120 and 140, it will be understood that the apparatus having the process flow 100 is configured to send the communication to the mobile device shortly after receiving the request via the user interface. For example, in some embodiments, the apparatus having the process flow 100 is configured to send the communication to the mobile device accessible to the user within moments, seconds, and/or minutes (e.g., within approximately 10-15 minutes, etc.) of: (a) determining that the problem occurred; (b) prompting the user to submit the request; (c) the user submitting the request via the user interface; and/or (d) the apparatus having the process flow 100 receiving the request via the user interface. As another example, in some embodiments, the apparatus having the process flow 100 is configured to send the communication to the mobile device while the user is still at and/or near the self-service machine.

In addition, it will be understood that the portion of the process flow 100 represented by the block 140 is meant to be construed broadly. For example, in some embodiments, the apparatus having the process flow 100 is configured to send the communication regarding the problem directly to the mobile device. As another example, in some embodiments, the apparatus having the process flow 100 is configured to send the communication indirectly (e.g., via one or more networks and/or apparatuses, etc.) to the mobile device. As still another example, in some embodiments, the apparatus having the process flow 100 is configured to send the communication to a particular address and/or account (e.g., email address, Facebook® page, online banking account, etc.) that can be accessed through the mobile device. Accordingly, it will be understood that all of these examples and other like examples are meant to be included in the phrase "send the communication . . . to the mobile device."

Regarding the block 130, it will be understood that the request can be received via the user interface in any way. For example, in some embodiments where the user interface includes an interactive display, the apparatus having the process flow 100 receives the request upon or after the user uses an input feature (e.g., digital button, etc.) that appears on the display. As another example, in some embodiments where the user interface includes one or more physical input features (e.g., physical button, lever, microphone, etc.) located on and/or near the self-service machine, the apparatus having the process flow 100 is configured to receive the request upon or after the user uses those physical input features to submit the request. It will also be understood that, in some embodiments, receiving the request includes receiving, via the user interface, an address and/or account associated with the mobile device and/or the user. For example, in some embodiments, receiving the request includes receiving, via the user interface, a telephone number for the mobile device. As another example, in some embodiments, receiving the request includes receiving, via the user interface, an email address for an email account that is accessible to the user via the mobile device.

It will further be understood that the apparatus having the process flow 100 can be configured to perform any of the portions of the process flow 100 represented by the blocks 110-140 upon or after one or more triggering events (which, in some embodiments, is one or more of the other portions of the process flow 100). As used herein, it will be understood that a "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the apparatus having the process flow 100 is configured such that the apparatus determining that the problem associated with the self-service machine occurred (the triggering event) automatically and immediately or nearly immediately triggers the apparatus to prompt the user to submit the request (the triggered action). In some embodiments, the apparatus is additionally or alternatively configured to automatically send the communication to the mobile device (triggered action) immediately or nearly immediately after receiving the request via the user interface (triggering event).

Also, it will be understood that, in some embodiments, a predetermined time and/or the passage of a predetermined period of time may serve to trigger one or more of the portions represented by the blocks 110-140. For example, in some embodiments, the apparatus having the process flow 100 is configured to send the communication to the mobile device after approximately seven minutes have elapsed since the apparatus received the request. It will also be understood that, in accordance with some embodiments, the apparatus having the process flow 100 is configured to automatically perform one or more of the portions of the process flow 100 represented by the blocks 110-140, whereas in other embodiments, one or more of the portions of the process flow 100 represented by the blocks 110-140 require and/or involve human intervention. In addition, it will be understood that, in some embodiments, the apparatus having the process flow 100 (and/or a user thereof) is configured to perform each portion of the process flow 100, from start to finish, within moments, seconds, and/or minutes (e.g., within approximately 10-15 minutes, etc.).

Further, it will be understood that the number, order, and/or content of the portions of the process flow 100 are exemplary and may vary. For example, in some embodiments, the apparatus having the process flow 100 is configured to omit the portions of the process flow 100 represented by the blocks 120 and 130 because, for example, the apparatus is configured to automatically send the communication to the mobile device immediately or nearly immediately after determining that the problem associated with the self-service machine occurred. As another example, in some embodiments, the apparatus having the process flow 100 is only configured to receive the request and send the communication, thereby omitting the portions of the process flow 100 represented by the blocks 110 and 120.

As still another example, in some embodiments, the apparatus having the process flow 100 can be configured to perform one or more additional or alternative functions. For example, in some embodiments, the apparatus having the process flow 100 is additionally or alternatively configured to receive information associated with (e.g., information about, information describing, information identifying, etc.) the self-service machine, the problem, and/or the user. Among other things, this information may include: the nature of the problem; the date and/or time when the problem occurred; how the problem occurred; the identity of the self-service machine; the identity of the self-service machine user; the nature of the transaction during which the problem occurred; the identities of the financial accounts (if any) involved in that transaction; and/or the like. In some embodiments, the apparatus having the process flow 100 is configured to collect and/or otherwise receive this information from the self-service machine, but in other embodiments, the apparatus is additionally or alternatively configured to collect and/or receive this information from one or more other apparatuses and/or users (e.g., the user of the self-service machine, a customer service representative, etc.).

As another example, in some embodiments, the apparatus having the process flow 100 is additionally or alternatively configured to: (a) locate an available customer service representative to contact the user regarding the problem; and (b) send, to a user interface apparatus accessible to the customer service representative, information associated with the request, the self-service machine, the user, and/or the problem, such that the customer service representative can contact the user at the mobile device regarding the problem. In some embodiments, the apparatus having this alternative process flow 100 is configured to locate the customer service representative and send the representative the above information, such that the customer service representative can contact the user within moments, seconds, and/or minutes of the user submitting the request to receive a communication regarding the problem.

Further, it will be understood that the apparatus having the process flow 100 can be configured to perform any one or more of the portions of any one or more embodiments described and/or contemplated herein, including, for example, any one or more of the portions of the process flows 200 and/or 400 described later herein.

Referring now to FIG. 2, a general process flow 200 of an apparatus for responding to a problem associated with a self-service machine is provided, in accordance with an embodiment of the present invention. Like the apparatus having the process flow 100, the apparatus having the process flow 200 is configured to determine that a problem associated with a self-service machine occurred during a transaction involving the self-service machine and a user of the self-service machine, as represented by the block 110 in the process flow 200. As represented by the block 210, the apparatus having the process flow 200 is also configured to present, to the user via a user interface associated with the self-service machine, a code based at least partially on determining that the problem occurred. As represented by the block 220, the apparatus is further configured to receive the code from the user, and as represented by the block 230, the apparatus is configured to initiate a claim for the user based at least partially on receiving the code from the user.

It will also be understood that the apparatus having the process flow 200 can include one or more separate apparatuses (e.g., the self-service machine 320 illustrated in FIG. 3, the control apparatus 330 illustrated in FIG. 3, the user interface apparatus 303 illustrated in FIG. 3, etc.). For example, in some embodiments, one apparatus (e.g., the control apparatus 330, etc.) is configured to perform the portion of the process flow 200 represented by the block 110, and a second apparatus (e.g., the self-service machine 320 described in FIG. 3, etc.) is configured to perform the portions represented by the blocks 210-230. As another example, in some embodiments, one apparatus (e.g., the control apparatus 330, etc.) is configured to perform the portion of the process flow 100 represented by the block 110, a second apparatus (e.g., the self-service machine 320, etc.) is configured to perform the portion represented by the block 210, and a third apparatus (e.g., the user interface apparatus 303, etc.) is configured to perform the portions represented by the blocks 220-230. As still another example, in some embodiments, a single apparatus (e.g., the control apparatus 330, etc.) is configured to perform each and every portion of the process flow 200. It will also be understood that, in some embodiments, a self-service machine (e.g., the self-service machine 320, etc.) is configured to perform one or more (or all) of the portions of the process flow 200, and that in some embodiments, that self-service machine is the self-service machine referred to in the blocks 110 and 210.

Regarding the block 210, it will be understood that the code can include any type and/or amount of information. For example, in some embodiments, the code includes a string of one or more alphanumeric characters, such as, for example, the string "1GHZL45" shown as the code 315 on the receipt 306 in FIG. 3. As another example, in some embodiments, the code includes one or more symbols, images, non-alphanumeric characters, and/or the like. It will also be understood that, in some embodiments, the code serves to identify the user, the self-service machine, the problem, and/or the transaction. For example, in some embodiments, the code includes one or more portions of a customer number, account number, social security number, and/or the like that serves to identify the self-service machine user. As another example, in some embodiments, the code includes one or more portions of a self-service machine number, self-service machine location, and/or other self-service machine-specific information that serves to identify the self-service machine. As still another example, in some embodiments, the code includes information (e.g., a transaction code, etc.) that serves to identify the transaction (and/or attempted transaction) referred to in the block 110. As yet another example, in some embodiments, the code includes information (e.g., a problem code, etc.) that serves to identify the problem referred to in the block 110. In some embodiments, the code does not include any self-service machine-, problem-, transaction-, and/or user-identifying information in the code itself, but the code is stored in memory with, corresponds to, is tied to, and/or is otherwise associated with self-service machine-, problem-, transaction-, and/or user-identifying information. Accordingly, in such embodiments, knowing the code enables one to know the self-service machine-, problem-, transaction-, and/or user-identifying information.

It will also be understood that the apparatus having the process flow 200 can be configured to present the code to the user, via the user interface, in any way. For example, in some embodiments, the apparatus is configured to present the code to the user by using a receipt printer, housed in the self-service machine, to print a receipt that includes the code (e.g., has the code printed thereon, etc.). As another example, in some embodiments, the apparatus is configured to present the code to the user by displaying the code to the user at a display housed in the self-service machine.

Regarding the block 220, it will be understood that the apparatus having the process flow 200 is configured to receive the code from the user in any way. For example, in some embodiments, the apparatus is configured to receive the code from the user by receiving, via a mobile device accessible to the user (e.g., the mobile device described above in connection with FIG. 1, the mobile device 304 described later herein in connection with FIG. 3, etc.). More specifically, in some embodiments where the apparatus having the process flow 200 includes the portion of the process flow 100 represented by the block 140, the apparatus (and/or a user thereof) is configured to receive the code from the user in response to sending the communication regarding the problem to the mobile device accessible to the user. In some embodiments where the communication includes a call from a customer service representative at a user interface apparatus to the self-service machine user at the mobile device, the apparatus having the process flow 200 is configured to receive the code from the user during the call (i.e., when the customer service representative receives the code from the user and then inputs that code into the apparatus having the process flow 200).

As another example, in some embodiments, the apparatus having the process flow 200 is configured to receive the code from the user by receiving the code from the user via a self-service machine. For example, in some embodiments where the apparatus having the process flow 200 includes a self-service machine (which, in some embodiments, is same self-service machine referred to in the blocks 110 and 210), the apparatus is configured to receive the code from the user when the user inputs the code into the self-service machine in order to, for example, initiate a claim related to the problem referred to in the block 110.

Further regarding the block 220, it will be understood that, in some embodiments, the code serves to authenticate the self-service machine user to the apparatus having the process flow 200 and/or to a user thereof. For example, in some embodiments, the code includes (and/or serves as) a temporary or non-temporary password and/or other credential for verifying that the self-service machine user is who he says he is. As such, the apparatus and/or a user thereof can authenticate the self-service machine user as being the user involved in the transaction referred to in the block 110 based at least partially on receiving the code from the self-service machine user. For example, in some embodiments, the apparatus having the process flow 200 is configured to store the code presented to the self-service machine user in memory so that the apparatus and/or a user thereof can later authenticate the self-service machine user based at least partially on a comparison of the code received from the self-service machine user to the code stored in memory. In such embodiments, if the two codes match, the apparatus having the process flow 200 and/or a user thereof can be reasonably sure that the self-service machine user is who he says he is and/or that the self-service machine user is the user involved in the transaction referred to in the block 110.

Regarding the block 230, it will be understood that, in some embodiments, the apparatus having the process flow 200 and/or a user thereof is configured to initiate the claim for the user based at least partially on authenticating the self-service machine user (e.g., as above, by comparing the code stored in memory to the code received from the self-service machine user, etc.). In some embodiments, the apparatus having the process flow 200 and/or a user thereof will not initiate a claim for the self-service machine user until the self-service machine user authenticates himself to the apparatus and/or to the user thereof by providing the code.

It will also be understood that the apparatus having the process flow 200 can be configured to initiate a claim that relates to any problem associated with a self-service machine. For example, in some embodiments where the self-service machine is an ATM, the apparatus is configured to initiate a claim for the user that relates to the ATM dispensing less cash to the ATM user than the user requested and/or that was debited from the user's account. As another example, in some embodiments where the self-service machine is an ATM, the apparatus having the process flow 200 is configured to initiate a claim for an ATM user that relates to the ATM user's check jamming in the ATM during an attempted deposit transaction. As still another example, in some embodiments where the self-service machine is a vending machine, the apparatus is configured to initiate a claim for the vending machine user that relates to a vending machine item being stuck in the vending machine. As yet another example, in some embodiments where the self-service machine is a self-checkout machine, the apparatus having the process flow 200 is configured to initiate a claim that relates to the self-checkout machine overcharging the machine user. Also, it will be understood that the phrase "initiating a claim" can include initiating the claim, processing the claim, completing the claim, and/or otherwise facilitating the claim.

Of course, it will be understood that the embodiment illustrated in FIG. 2 is merely exemplary and that other embodiments may vary without departing from the scope and spirit of the present invention. In addition, it will also be understood that the apparatus having the process flow 200 can be configured to perform one or more portions of the process flow 200 in real time, in substantially real time, and/or at one or more predetermined times. It will further be understood that the apparatus having the process flow 200 can be configured to perform any of the portions of the process flow 200 represented by the blocks 110-230 upon or after one or more triggering events (which, in some embodiments, is the performance of one or more of the other portions of the process flow 200). In addition, it will be understood that, in some embodiments, the apparatus having the process flow 200 (and/or a user thereof) is configured to perform each portion of the process flow 200, from start to finish, within moments, seconds, and/or minutes (e.g., within approximately 10-15 minutes, etc.).

Referring now to FIG. 3, a system 300 for is provided for responding to a problem associated with a self-service machine is provided, in accordance with an embodiment of the present invention. As illustrated, the system 300 includes a network 310, a self-service machine 320, a control apparatus 330, a user interface apparatus 303, and a mobile device 304. Also shown are a self-service machine user 302, a customer service representative 301, and a receipt 306 having a code 315. It will be understood that the customer service representative 301 has access to the user interface apparatus 303, the self-service machine user 302 has access to the self-service machine 320 and the mobile device 304, and that the user interface apparatus 303 is configured to communicate with the mobile device 304 via the network 310. It will be also be understood that FIG. 3 depicts the self-service machine user 302 receiving a receipt 306 from the self-service machine 320 in response to a problem associated with the self-service machine that occurred during a transaction involving the self-service machine user 302 and the self-service machine 320.

It will be further understood that, in accordance with some embodiments of the present invention, the self-service machine 320, the control apparatus 330, and/or the user interface apparatus 303 are each operated, serviced, controlled, and/or maintained (collectively herein "maintained" for simplicity) by the same business (not shown), and that, in some embodiments, the customer service representative 301 is an agent and/or employee of that business who is working in the business' customer service department. For example, in some embodiments, the self-service machine 320, the control apparatus 330, and/or the user interface apparatus 303 are each maintained by the same financial institution. Additionally, in some of these embodiments, the customer service representative 301 is an employee of the financial institution, the self-service machine user 302 is a customer of the financial institution, and/or the self-service machine 320 is embodied as an ATM maintained by the financial institution.

As shown in FIG. 3, the self-service machine 320, the control apparatus 330, the user interface apparatus 303, and the mobile device 304 are each operatively and selectively connected to the network 310, which may include one or more separate networks. In addition, the network 310 may include one or more interbank networks, telephone networks, telecommunication networks, local area networks (LANs), wide area networks (WANs), and/or global area networks (GANs) (e.g., the Internet, etc.). It will also be understood that the network 310 may be secure and/or unsecure and may also include wireless and/or wireline technology.

The self-service machine 320 may include any computerized apparatus that can be configured to perform any one or more of the functions of the self-service machine 320 described and/or contemplated herein. It will also be understood that the self-service machine 320 can include and/or be embodied as any self-service machine described and/or contemplated herein. It will further be understood that the self-service machine 320 can initiate, perform, and/or otherwise facilitate any transaction described and/or contemplated herein as being initiated, performed, and/or otherwise facilitated by a self-service machine. For example, in some embodiments, the self-service machine 320 includes an ATM, a ticketing kiosk, a self-checkout machine, a vending machine, and/or the like. As another example, in some embodiments, the self-service machine 320 is configured to initiate, perform, and/or otherwise facilitate one or more financial and/or non-financial transactions, including, for example, withdrawing cash; making deposits (e.g., cash, checks, etc.); making payments (e.g., paying telephone bills, etc.); purchasing, renting, selling, and/or leasing goods and/or services (e.g., stamps, tickets, gift certificates, DVDs, vending machine items, merchandise, groceries, etc.); initiating, completing, and/or sending an application (e.g., applying for a job, applying for a loan, etc.); accessing the Internet; and/or the like.

In some embodiments, the self-service machine 320 requires its users to identify and/or authenticate themselves to the self-service machine 320 before the self-service machine 320 will initiate, perform, and/or facilitate a transaction. For example, in some embodiments, the self-service machine 320 is configured to identify and/or authenticate a self-service machine user based at least partially on an ATM/debit/credit card, loyalty/rewards/club card, smart card, token (e.g., USB token, etc.), username/password, personal identification number (PIN), biometric information, and/or some other information and/or device that the user provides to the self-service machine 320. Additionally or alternatively, in some embodiments, the self-service machine 320 is configured to identify and/or authenticate a user by using one-, two-, or multi-factor identification and/or authentication. For example, in some embodiments, the self-service machine 320 requires two-factor authentication, such that the self-service machine user 302 must provide the correct smart card and enter the correct PIN in order to authenticate the user 302 to the self-service machine 320.

As illustrated in FIG. 3, in accordance with some embodiments of the present invention, the self-service machine 320 includes a communication interface 322, a processor 324, a memory 326 having a self-service machine application 327 stored therein, and a user interface 329. In such embodiments, the processor 324 is operatively and selectively connected to the communication interface 322, the user interface 329, and the memory 326.

Each communication interface described herein, including the communication interface 322, generally includes hardware, and, in some instances, software, that enables a portion of the system 300, such as the self-service machine 320, to send, receive, and/or otherwise communicate information to and/or from the communication interface of one or more other portions of the system 300. For example, the communication interface 322 of the self-service machine 320 may include a modem, network interface controller (NIC), network adapter, network interface card, and/or some other electronic communication device that operatively connects the self-service machine 320 to another portion of the system 300, such as, for example, the control apparatus 330.

Each processor described herein, including the processor 324, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the self-service machine application 327 of the memory 326 of the self-service machine 320.

Each memory device described herein, including the memory 326 for storing the self-service machine application 327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 3, the memory 326 includes the self-service machine application 327. It will be understood that, in some embodiments, the self-service machine application 327 is configured to initiate, perform, and/or facilitate one or more of the portions of one or more of the embodiments described and/or contemplated herein, such as, for example, one or more of the portions of the process flows 100 and/or 200 described herein. For example, in some embodiments, the self-service machine application 327 is configured to present, to the self-service machine user 302 at the user interface 329, the prompt referred to in the process flow 100 and/or the code referred to in the process flow 200. As another example, in some embodiments, the self-service machine application 327 is configured to receive, via the user interface 329, the request referred to the process flow 100 and/or the code referred to in the process flow 200. As still another example, in some embodiments, the self-service machine application 327 is configured to determine that a problem associated with the self-service machine 320 occurred during a transaction involving the self-service machine 320 and the self-service machine user 302. As yet another example, in some embodiments, the self-service machine application 327 is additionally or alternatively configured to initiate a claim for the self-service machine user 302 that relates the problem associated with the self-service machine 320. In some embodiments, the self-service machine application 327 is configured to access an online banking account, such that, for example, the self-service machine application 327 can initiate a claim related to the problem via the user's online banking account.

It will also be understood that, in some embodiments, the self-service machine application 327 is configured to enable the self-service machine user 302 and/or self-service machine 320 to communicate with one or more other portions of the system 300, and/or vice versa. It will further be understood that, in some embodiments, the self-service machine application 327 is configured to initiate, perform, and/or otherwise facilitate one or more financial and/or non-financial transactions. In some embodiments, the self-service machine application 327 includes computer-executable program code portions for instructing the processor 324 to perform one or more of the functions of the self-service machine application 327 and/or self-service machine 320 described and/or contemplated herein. In some embodiments, the self-service machine application 327 may include and/or use one or more network and/or system communication protocols.

The self-service machine 320 also includes the user interface 329. It will be understood that the user interface 329 can include and/or be embodied as one or more user interfaces. It will also be understood that, in some embodiments, the user interface 329 includes one or more user output devices for presenting information and/or one or more items to the self-service machine user 302, such as, for example, one or more displays, speakers, receipt printers, dispensers (e.g., cash dispensers, ticket dispensers, merchandise dispensers, etc.), and/or the like. In some embodiments, the user interface 329 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, card readers (e.g., for reading the magnetic strip on magnetic cards such as ATM, debit, credit, and/or bank cards, etc.), deposit mechanisms (e.g., for depositing checks and/or cash, etc.), and/or the like for receiving information from one or more items and/or from the self-service machine user 302. In some embodiments, the user interface 329 and/or the self-service machine 320 includes one or more vaults, security sensors, locks, and/or anything else typically included in and/or near a conventional self-service machine.

FIG. 3 also illustrates a control apparatus 330, in accordance with an embodiment of the present invention. The control apparatus 330 may include any computerized apparatus that can be configured to perform any one or more of the functions of the control apparatus 330 described and/or contemplated herein. In some embodiments, for example, the control apparatus 330 includes one or more servers, mainframes, personal computers, engines, network devices, front end systems, back end systems, and/or the like. In some embodiments, such as the one illustrated in FIG. 3, the control apparatus 330 includes a communication interface 332, a processor 334, and a memory 336, which includes a control application 337 and a control datastore 338 stored therein. As shown, the communication interface 332 is operatively and selectively connected to the processor 334, which is operatively and selectively connected to the memory 336.

It will be understood that, in some embodiments, the control application 337 is configured to initiate, perform, and/or facilitate one or more of the portions of one or more of the embodiments described and/or contemplated herein, such as, for example, one or more of the portions of the process flows 100 and/or 200 described herein. For example, in some embodiments, the control application 337 is configured to determine that a problem associated with the self-service machine 320 occurred during a transaction involving the self-service machine 320 and the self-service machine user 302. As another example, in some embodiments, the control application 337 is configured to present, to the self-service machine user 302 via the user interface 329, a code. As still another example, in some embodiments, the control application 337 is configured to initiate a claim for the user based at least partially on receiving the code. In some embodiments, the control application 327 is configured to access an online banking account, such that, for example, the control application 327 can initiate a claim related to the problem via the online banking account.

It will also be understood that, in some embodiments, the control application 337 is configured to enable the control apparatus 330 to communicate with one or more other portions of the system 300, such as, for example, the control datastore 338 and/or the self-service machine 320, and/or vice versa. It will further be understood that, in some embodiments, the control application 337 is configured to initiate, perform, and/or otherwise facilitate one or more financial and/or non-financial transactions. In some embodiments, the control application 337 includes computer-executable program code portions for instructing the processor 334 to perform one or more of the functions of the control application 337 and/or control apparatus 330 described and/or contemplated herein. In some embodiments, the control application 337 may include and/or use one or more network and/or system communication protocols.

In addition to the control application 337, the memory 336 also includes the control datastore 338. It will be understood that the control datastore 338 can be configured to store any type and/or amount of information. For example, in some embodiments, the control datastore 338 includes information associated with one or more self-service machines, self-service machine users, transactions, financial accounts, and/or the like. In some embodiments, the control datastore 338 may also store any information related to responding to problems associated with self-service machines. In some embodiments, the control datastore 338 additionally or alternatively stores information associated with online banking and/or online banking accounts.

It will be understood that the control datastore 338 may include any one or more storage devices, including, but not limited to, datastores, databases, and/or any of the other storage devices typically associated with a computer system. It will also be understood that the control datastore 338 may store information in any known way, such as, for example, by using one or more computer codes and/or languages, alphanumeric character strings, data sets, figures, tables, charts, links, documents, and/or the like. Further, in some embodiments, the control datastore 338 may include information associated with one or more applications, such as, for example, the control application 337. It will also be understood that, in some embodiments, the control datastore 338 provides a real-time or near real-time representation of the information stored therein, so that, for example, when the processor 334 accesses the control datastore 338, the information stored therein is current or nearly current.

FIG. 3 also illustrates the mobile device 304. It will be understood that the mobile device 304 can include any one or more of the examples of mobile devices described and/or contemplated herein, including, for example, one or more mobile phones (e.g., feature phones, smart phones, etc.), personal digital assistants (PDAs), handheld computers (e.g., laptop computers, tablet computers, etc.), handheld game consoles (e.g., Nintendo DS®), PlayStation Portable®, etc.), and/or the like.

Also shown in FIG. 3 is the user interface apparatus 303. It will be understood that the user interface apparatus 303 may include any computerized apparatus that can be configured to perform any one or more of the functions of the user interface apparatus 303 described and/or contemplated herein. In some embodiments, the user interface apparatus 303 is configured to initiate, perform, and/or facilitate one or more of the portions of one or more of the embodiments described and/or contemplated herein, such as, for example, one or more of the portions of the process flows 100 and/or 200 described herein. It will also be understood that, in accordance with some embodiments, the user interface apparatus can include a mobile device (e.g., mobile phone, tablet computer, etc.), a telephone system (e.g., including a telephone set, headset, telecom switch, etc.), a work station, a personal computer, a kiosk, a server, a network device, a back end system, a front end system, and/or the like. It will also be understood that the user interface apparatus 303 (and/or the mobile device 304) can include a communication interface, a processor, a memory having an application and/or datastore stored therein, and/or a user interface. Thus, it will be understood that, in accordance with some embodiments, the user interface apparatus 303 (and/or the mobile device 304) include components that are similar and/or identical to the components included in the self-service machine 320 and/or the control apparatus 330.

Of course, it will be understood that the embodiment illustrated in FIG. 3 is exemplary and that other embodiments may vary. For example, in some embodiments, some or all of the portions of the system 300 are combined into a single portion. Specifically, in some embodiments, the self-service machine 320 and the control apparatus 330 are combined into a single self-service machine and control apparatus that is configured to perform all of the same functions of those separate portions as described and/or contemplated herein. Likewise, in some embodiments, some or all of the portions of the system 300 are separated into two or more distinct portions. In addition, the various portions of the system 300 may be maintained by the same or separate parties. For example, in some embodiments where the self-service machine 320 includes an ATM, a single bank may maintain the ATM, the control apparatus 330, and the user interface apparatus 303. However, in other embodiments, the control apparatus 330 and the self-service machine 320 are maintained by separate entities.

It will also be understood that the system 300 (and/or one or more portions of the system 300) may include and/or implement any embodiment of the present invention described and/or contemplated herein. For example, in some embodiments, the system 300 (and/or one or more portions of the system 300) is configured to implement any one or more of the embodiments of the process flow 100 described and/or contemplated herein in connection with FIG. 1, any one or more of the embodiments of the process flow 200 described and/or contemplated herein in connection with FIG. 2, any one or more of the embodiments of the process flow 400 described and/or contemplated herein in connection with FIG. 4, and/or any one or more of the embodiments of the process flow 500 described and/or contemplated herein in connection with FIGS. 5-5D.

As a specific example, in accordance with an embodiment of the present invention, (1) the control apparatus 330 is configured to determine that a problem associated with the self-service machine 320 occurred during a transaction involving the self-service machine 320 and the self-service machine user 302, as represented by the block 110 in FIG. 1; (2) the self-service machine 320 is configured to prompt, via the user interface 329, the self-service machine user 302 to submit a request to receive, at the mobile device 304, a communication regarding the problem, as represented by the block 120; (3) the self-service machine 320 is configured to receive the request via the user interface 329, as represented by the block 130; and (4) the user interface apparatus 303 is configured to send the communication regarding the problem to the mobile device 304, as represented by the block 140 in FIG. 1. It will be understood that, in accordance with some embodiments, the self-service machine 320, the control apparatus 330, the user interface apparatus 303, and/or the mobile device 304 are each configured to send and/or receive one or more instructions to and/or from each other, such that an instruction sent from a first apparatus to a second apparatus can trigger that second apparatus to perform one or more portions of any one or more of the embodiments described and/or contemplated herein.

Referring now to FIG. 4, a mixed block and flow diagram of a system 400 for responding to a problem associated with a self-service machine is provided, in accordance with a more-detailed embodiment of the present invention. As shown, the system 400 includes a self-service machine 401 (e.g., the self-service machine 320 shown in FIG. 3, etc.), a control apparatus 403 (e.g., the control apparatus 330 shown in FIG. 3, etc.), a user interface apparatus 405 (e.g., the user interface apparatus 303 shown in FIG. 3, etc.), and a mobile device 407 (e.g., the mobile device 304 shown in FIG. 3, etc.). It will be understood that the self-service machine 401 and the user interface apparatus 405 are operatively and selectively connected to the control apparatus 403 via one or more networks (not shown), and that the mobile device 407 is operatively and selectively connected to the user interface apparatus 405 via one or more same or different networks (not shown). It will also be understood that, in accordance with some embodiments, the self-service machine 401 and the mobile device 407 are accessible to a self-service machine user (not shown), and that the user interface apparatus 405 is accessible to a customer service representative (not shown). It will further be understood that, in accordance with some embodiments, the self-service machine 401, the control apparatus 403, and the user interface apparatus 405 are maintained by the same business (e.g., a retail store, a bank, etc.), and that the customer service representative is an employee of that business.

As represented by the block 410, the control apparatus 403 determines that a problem associated with the self-service machine 401 occurred during a transaction involving the self-service machine 401 and the self-service machine user. Then, as represented by the block 415, the self-service machine 401 prompts, via a touchscreen display on the self-service machine 401, the user to request that a customer service representative call the user, at a mobile device accessible to the user, regarding the problem. As represented by the block 420, the self-service machine 401 receives the request from the user via the touchscreen display. Thereafter, as represented by the block 425, the self-service machine 401 requests and receives the telephone number for the mobile device 407 via the touchscreen display. Then, as represented by the block 430, the self-service machine 401 prints a receipt for the user that includes a code thereon.

As represented by the block 435, after the self-service machine 401 receives the telephone number for the mobile device 407, the control apparatus 403 collects (e.g., from the self-service machine 401 and/or the control apparatus 403, etc.) and sends, to a customer service representative at the user interface apparatus 405, information associated with the request, the user, the self-service machine 401, the transaction, the problem, and/or the code. As represented by the block 440, the customer service representative uses the user interface apparatus 405 to receive this information and to call the user at the mobile device 407 regarding the problem. Then, as represented by the block 445, the user uses the mobile device 407 to receive the call from the customer service representative, to provide the code to the customer service representative, and/or to discuss the problem with the customer service representative. It will be understood that the user may provide the code to the customer service representative to, for example, authenticate the user to the customer service representative and/or to identify the problem for the customer service representative. Then, as represented by the block 450, the customer service representative uses the user interface apparatus 405 to initiate a claim for the user that is based at least partially on the problem.

It will be understood that the embodiment illustrated in FIG. 4 is merely exemplary and that other embodiments may vary without departing from the scope and spirit of the present invention. For example, in some alternative embodiments, one or more of the portions of the process flow represented by the blocks 415-430 are initiated, performed, and/or facilitated by the control apparatus 403 instead of by the self-service machine 401. As another example, in some other alternative embodiments, one or more of the portions of the process flow represented by the blocks 410 and 435 are initiated, performed, and/or facilitated by the self-service machine 401 instead of the control apparatus 403, thereby altogether omitting the use of and/or need for the control apparatus 403.

It will also be understood that, in some embodiments, one or more of the portions of the process flow represented by the blocks 410-450 are triggered by one or more triggering events, which, in some embodiments, includes the performance of one or more of the other portions of the process flow represented by the blocks 410-450. Also, it will be understood that, in some embodiments, the system 400 is configured to perform the entire process flow represented by the blocks 410-450, from start to finish, within moments, seconds, and/or minutes. For example, in some embodiments, the user receives the call from the customer service representative within approximately 10-15 minutes of the self-service machine 401 receiving the telephone number for the mobile device 407. Accordingly, in some embodiments, shortly after the self-service machine user experiences a problem associated with the self-service machine 401, the user receives a telephone call regarding the problem from a live, human customer service representative, thereby delivering improved customer service, reducing retail store and/or banking center traffic, and improving claim accuracy.

Referring now to FIGS. 5-5D, a series of exemplary display pages 500-504 are provided, in accordance with an embodiment of the present invention. It will be understood that, in some embodiments, each of the pages 500-504 is displayed on the same touchscreen display that is housed in, located near, and/or otherwise associated with a single ATM. Of course, it will be understood that, in other embodiments of the present invention, the display pages 500-504 (or a slight variation thereof) are displayed on a touchscreen display that is housed in, located near, and/or is otherwise associated with some other type of self-service machine (e.g., kiosk, self-checkout machine, vending machine, etc.).

Also, it will be understood that the touchscreen display that displays each of the pages 500-504 is configured to navigate from one page to another page. For example, in some embodiments, the touchscreen display is configured to navigate from the page 500 to the page 501, from the page 501 to the page 502, from the page 502 to the page 503, from the page 503 to the page 504, and/or vice versa. It will be further understood that the display pages 500-504 can be embodied as portions of a dashboard application, portions of a portal application, as intranet pages, as Internet web pages, and/or the like. In addition, it will be understood that, in some embodiments, the apparatus having the process flow 100, the apparatus having the process flow 200, the system having the process flow 300 (and/or one or more of the underlying apparatuses), and/or the system 400 are configured to implement any one or more of the embodiments of the present invention described and/or contemplated herein in connection with the display pages 500-504.

Referring now to FIG. 5, it will be understood that the display page 500 is displayed on the touchscreen display after and/or in response to an apparatus (e.g., the apparatus having the process flow 100, the control apparatus 330, the ATM associated with the touchscreen display, etc.) determining that a problem associated with the ATM occurred. As shown, the display page 500 includes a header 500*a*, information associated with the problem 500*b*, a question 500*c*, a "Call Me Now" selectable digital button 500*d*, and a "No Thanks" selectable digital button 500*e*. In this embodiment, the header 500*a* is "Unable to Return Checks." The information associated with the problem 500*b* states that the ATM is unable to process a request and/or return one or more checks (e.g., the one or more checks were inserted by the user into a deposit mechanism housed in the ATM, the checks could not be read by an optical scanner housed in the ATM, and then the checks jammed in the deposit mechanism before they could be returned to the user, etc.). The question 500*c* asks the user, "Would you like to speak to a bank representative now?" In response to the prompt 500*c*, the user can select the "Call Me Now" button 500*d* or the "No Thanks" button 500*e*. If the user selects the "Call Me Now" button 500*d*, the touchscreen display will navigate to the page 501. If the user selects the "No Thanks" button 500*e*, then, in some embodiments, the ATM will print out a receipt for the user that includes a code (e.g., the code referred to in the process flow 200, etc.). It will be understood that, in some embodiments, the question 500*c* and the "Call Me Now" button 500*d* combine to prompt the user to submit a request (i.e., by selecting the "Call Me Now"

button 500d) for a customer service representative to call the user at a mobile device accessible to the user.

Referring now to FIG. 5A, the display page 501 includes a header 501a, a prompt 501b, a plurality of selectable digital buttons 501c, a display field 501d, an "Enter" selectable digital button 501e, a "Clear" selectable digital button 501f, and a "Cancel" selectable digital button 501g. In this embodiment, the header 501a is "Call Me Now Phone Number Entry." The prompt 501b prompts the user, "Please enter the phone number where you can be reached right now, including area code." As prompted, the user can enter (i.e., input) the phone number for a mobile device accessible to the user (e.g., the mobile device referred to in the process flow 100, etc.) by using one or more of the plurality of buttons 501c. As the user enters the telephone number by using the buttons 501c, the telephone number will appear in the display field 501d. In this embodiment, the telephone number "555-123-4567" was entered, and that number appears in the display field 501d. If the user has made a mistake in entering the telephone number, the user may select the "Clear" button 501f to correct the mistake. However, if the user has entered the telephone number correctly, the user may select the "Enter" button 501e, whereby the touchscreen display will navigate to the page 502. Also, at any time, if the user wishes to go back to the page 500 from the page 501 and/or otherwise wishes to cancel the request process, the user may select the "Cancel" button 501g.

Referring now to FIG. 5B, the display page 502 includes a header 502a, a display field 502b, a question 502c, an "Enter" selectable digital button 502d, a "Back" selectable digital button 502e, and a "Cancel" selectable digital button 502f. It will be understood that the display page 502 serves as a confirmation page for the user to review and confirm the telephone number entered from the previous page 501. As such, in this embodiment, the header 502a is "Confirm Entry." The display field 502b displays the telephone number (e.g., in this embodiment, 555-123-4567, etc.) that the user entered from the previous page 501. The question 502c asks the user, "You entered 555-123-4567. Is this correct?" If the telephone number is not correct, then the user may select the "Back" button 502e to return to the page 501 and correct the mistake. However, if the telephone number is correct, then the user may confirm that telephone number by selecting the "Enter" button 502d, whereby the touchscreen display will navigate to the page 503. Again, at any time, if the user wishes to go back to the page 501 from the page 502 and/or otherwise wishes to cancel the request process, the user may select the "Cancel" button 502f.

Referring now to FIG. 5C, the display page 503 includes a header 503a, a statement 503b, a first prompt 503c, and a second prompt 503d. In this embodiment, the header 503a is "Take Receipt." The statement 503b states, "You will be contacted within minutes by a bank representative." The first prompt 503c prompts the user, "A special code has been provided on your receipt, please give it to the representative when asked." The second prompt 503d prompts the user, "Please allow printing to complete before taking receipt." It will be understood that, in some embodiments, as the page 503 is displayed on the touchscreen display, a receipt is being printed from the ATM. In some embodiments, the receipt includes a code (e.g., the code 315 from the receipt 306, etc.) and/or a customer service phone number (e.g., the general number for the bank's customer service department, the direct number for a particular customer service representative, etc.). It will also be understood that, in some embodiments, the page 503 is displayed on the touchscreen display for a few moments (e.g., 30 seconds or less, etc.) before the touchscreen display navigates to the display page 504.

Referring now to FIG. 5D, the display page 504 includes a header 504a, a first prompt 504b, and a second prompt 504c. In this embodiment, the header 504a is "Take Card." The first prompt 504b prompts the user, "Please take your card." The second prompt 504c prompts the user, "If you haven't received a call in 10 minutes, please contact customer service using the phone number printed on the receipt." It will be understood that, in some embodiments, as the page 504 is displayed on the touchscreen display, the user's ATM card is being returned to the user from the card reader housed in the ATM. It will also be understood that, in some embodiments, the page 504 is displayed on the touchscreen display for a few moments (e.g., 30 seconds or less, etc.) before the touchscreen display navigates to a default and/or opening display page (not shown). Further, it will be understood that, in some embodiments, a customer service representative, using a user interface apparatus (e.g., the user interface apparatus 303 in FIG. 3, etc.), calls the telephone number entered into the display page 501 within minutes (e.g., within 10-15 minutes, etc.) of the user viewing one or more of the pages 503 or 504 on the touchscreen display.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
   a user interface associated with a self-service machine, wherein the user interface is configured to receive one or more inputs from a consumer that is using the self-service machine and communicate one or more outputs to the consumer; and
   a processor operatively connected to the user interface and configured to:
   determine that a problem associated with the self-service machine occurred during a transaction involving the self-service machine and the consumer, wherein the problem is determined independent of the consumer indicating the problem occurred;
   generate a claim code;
   automatically present, via the user interface, the claim code to the consumer, wherein automatically presenting the claim code to the consumer is based at least partially on the processor determining that the problem occurred during the transaction involving the self-service machine and the consumer and independent of the consumer indicating that the problem occurred; and
   initiate, via an online banking account associated with the consumer, a claim relating to the problem that occurred involving the self-service machine and the consumer based at least partially on the processor determining that the problem occurred during the transaction.

2. The apparatus of claim 1, wherein the user interface associated with the self-service machine comprises a receipt printer configured to print one or more receipts, and wherein the processor is configured to automatically present the code to the consumer by instructing the receipt printer to print a receipt comprising the code.

3. The apparatus of claim 1, wherein the user interface associated with the self-service machine comprises a display configured to display information, and wherein the processor is configured to automatically present the code to the consumer by instructing the display to display the code to the consumer.

4. The apparatus of claim 1, wherein the processor is further configured to:
initiate a claim for the consumer based at least partially on the receiving the code from the consumer, wherein the claim relates to the problem.

5. The apparatus of claim 1, wherein the processor is further configured to:
store the code automatically presented to the consumer in memory; and
authenticate the consumer as being the consumer involved in the transaction based at least partially on a comparison of the code received from the consumer to the code stored in memory.

6. The apparatus of claim 5, wherein the processor is further configured to:
initiate a claim for the u consumer based at least partially on the processor authenticating the consumer, wherein the claim relates to the problem.

7. The apparatus of claim 1, wherein the processor independently determining that the problem occurred during the transaction involving the self-service machine and the consumer is a triggering event for automatically presenting, via the user interface, the code to the consumer.

8. The apparatus of claim 1, wherein the code further comprises an identification of one or more of the location of the self-service machine or the problem associated with the self-service machine.

9. The apparatus of claim 1, wherein the processor determining that the problem associated with the self-service machine occurred during the transaction involving the self-service machine and the consumer is based at least partially on the processor receiving a problem message from a component that is in communication with the self-service machine, and wherein the problem message from the component in communication with the self-service machine identifies, at least, the problem that occurred during the transaction and the account involved in the transaction.

10. A computer-implemented method comprising:
providing a computer processor executing computer readable instruction code structured to cause the computer processor to:
determine that a problem associated with a self-service machine occurred during a transaction involving the self-service machine and a consumer of the self-service machine, wherein the problem is determined independent of the consumer indicating the problem occurred;
generate a claim code;
automatically present, to the consumer via a user interface associated with the self-service machine, the claim code, wherein automatically presenting the claim code is based at least partially on the determining that the problem occurred during the transaction involving the self-service machine and the consumer and independent of the consumer indicating that the problem occurred; and
initiate, via an online banking account associated with the consumer, a claim relating to the problem that occurred involving the self-service machine and the consumer based at least partially on the processor determining that the problem occurred during the transaction.

11. The computer-implemented method of claim 10, wherein the user interface associated with the self-service machine comprises a receipt printer configured to print one or more receipts, and wherein the automatically presenting the code to the consumer comprises printing, at the receipt printer, a receipt comprising the code.

12. The computer-implemented method of claim 10, wherein the user interface associated with the self-service machine comprises a display configured to display information, and wherein the automatically presenting the code to the consumer comprises displaying, at the display, the code to the consumer.

13. The computer-implemented method of claim 10, further comprising computer executable readable instruction code structured to cause the computer to:
initiate a claim for the consumer based at least partially on the receiving the code from the consumer, wherein the claim relates to the problem.

14. The computer-implemented method of claim 10, further comprising computer executable readable instruction code structured to cause the computer to:
store the code presented to the consumer in memory;
authenticate the consumer as being the consumer involved in the transaction based at least partially on a comparison of the code received from the consumer to the code stored in memory.

15. The computer-implemented method of claim 14, further comprising computer executable readable instruction code structured to cause the computer to:
initiate a claim for the consumer based at least partially on the authenticating the consumer, wherein the claim relates to the problem.

16. The computer-implemented method of claim 10, wherein the code serves to identify at least one of the self-service machine, the problem, the transaction, or the consumer.

17. The computer-implemented method of claim 16, wherein the code comprises information that identifies at least one of the self-service machine, the problem, the transaction, or the consumer.

18. The computer-implemented method of claim 16, further comprising computer executable readable instruction code structured to cause the computer to:
store the code in memory, such that the code is associated with information, wherein the information is associated with at least one of the self-service machine, the problem, the transaction, or the consumer.

19. An automated teller machine (ATM) comprising:
a user interface associated with the ATM, wherein the user interface is configured to receive one or more inputs from a consumer using the ATM and communicate one or more outputs to the consumer; and
a processor operatively connected to the user interface and configured to:
determine that a problem associated with the self-service machine occurred during a transaction involving the ATM and the consumer, wherein the problem is determined independent of the consumer indicating the problem being present;
generate a claim code;

automatically present, via the user interface, the claim code to the consumer during a transaction involving the consumer and the ATM, wherein the automatically presenting the claim code is based at least in part on the processor determining that the problem occurred during the transaction involving the ATM and the consumer and independent of the consumer indicating that the problem occurred;

receive the claim code from the consumer;

authenticate the consumer as being the consumer involved in the transaction based at least partially on the processor receiving the claim code from the consumer; and initiate, via an online banking account associated with the consumer, a claim relating to the problem that occurred involving the self-service machine and the consumer based at least partially on the processor determining that the problem occurred during the transaction.

20. The ATM of claim 19, wherein the processor is configured to present the code to the consumer based at least partially on a determination that a problem associated with the ATM occurred during the transaction.

21. The ATM of claim 19, wherein the processor is further configured to store the code presented to the consumer in memory, and wherein the processor is configured to authenticate the consumer based at least partially on a comparison of the code received from the consumer to the code stored in memory.

22. The ATM of claim 19, wherein the claim relates to the problem associated with the ATM that occurred during the transaction.

23. The ATM of claim 19, wherein the code serves to identify at least one of the ATM, the transaction, or the consumer.

24. A computer-implemented method comprising:

providing a computer processor executing computer readable instruction code structured to cause the computer processor to:

generate a claim code;

automatically present, via a user interface associated with a self-service machine, the claim code to a consumer using the self-service machine during a transaction involving the consumer and the self-service machine, wherein the self-service machine comprises an automated teller machine (ATM), wherein automatically presenting the claim code to the consumer is based at least in part on the processor determining that the problem occurred during the transaction involving the self-service machine and the consumer and independent of the consumer indicating that the problem occurred;

receiving the claim code from the consumer;

authenticate the consumer as being the consumer involved in the transaction based at least partially on the processor receiving the claim code from the consumer; and initiate, via an online banking account associated with the consumer, a claim relating to the problem that occurred involving the self-service machine and the consumer based at least partially on the processor determining that the problem occurred during the transaction.

25. The computer-implemented method of claim 24, wherein the presenting the code to the consumer is based at least partially on a determination that a problem associated with the self-service machine occurred during the transaction.

26. The computer-implemented method of claim 24, further comprising computer executable readable instruction code structured to cause the computer to:

store the code automatically presented to the consumer in memory, and wherein the authenticating the consumer comprises authenticating the consumer as being the user involved in the transaction based at least partially on a comparison of the code received from the consumer to the code stored in memory.

27. The computer-implemented method of claim 24, wherein the claim relates to a problem associated with the self-service machine that occurred during the transaction.

28. The computer-implemented method of claim 24, wherein the code serves to identify at least one of the self-service machine, the transaction, or the consumer.

29. The computer-implemented method of claim 28, wherein the code comprises information that identifies at least one of the self-service machine, the transaction, or the consumer.

30. The computer-implemented method of claim 28, further comprising computer executable readable instruction code structured to cause the computer to:

store the code in memory, such that the code is associated with information, wherein the information is associated with at least one of the self-service machine, the transaction, or the consumer.

31. A computer program product comprising a non-transitory computer-readable medium, wherein the computer-readable medium comprises computer-executable program code portions stored therein, wherein the computer-executable program code portions comprise:

program code portions configured to:

determine that a problem associated with a self-service machine occurred during a transaction involving the self-service machine and a consumer using the self-service machine, wherein the problem is determined independent of the consumer indicating the problem;

generate a claim code;

automatically present, to the consumer via a user interface associated with the self-service machine, the claim code based at least partially on the determining that the problem occurred during the transaction involving the self-service machine and the consumer and independent of the consumer indicating that the problem occurred; and initiate, via an online banking account associated with the consumer, a claim relating to the problem that occurred involving the self-service machine and the consumer based at least partially on the processor determining that the problem occurred during the transaction.

32. The computer program product of claim 31, further comprising a program code portion configured to:

initiate a claim for the consumer based at least partially on receiving the code from the consumer, wherein the claim relates to the problem.

33. The computer program product of claim 31, further comprising program code portions configured to:

store the code presented to the consumer in memory; and authenticate the consumer as being the consumer involved in the transaction based at least partially on a comparison of the code received from the consumer to the code stored in memory.

34. The computer program product of claim 31, further comprising computer program code portion configured to:

initiate a claim for the consumer based at least partially on the program code portion configured to authenticate the consumer, wherein the claim relates to the problem.

35. The computer program product of claim 31, wherein the code serves to identify at least one of the self-service machine, the problem, the transaction, or the consumer.

* * * * *